(12) United States Patent
d'Ottaviano Chiaramonti et al.

(10) Patent No.: US 10,367,798 B2
(45) Date of Patent: Jul. 30, 2019

(54) COMMUNICATIONS DEVICE, SYSTEM AND METHOD

(71) Applicant: Nettoken Limited, London (GB)

(72) Inventors: Simonetta d'Ottaviano Chiaramonti, London (GB); Ian Glenn Goode, London (GB); Doina-Manuela Neagu, London (GB); Charlotte Mary Slingsby, London (GB)

(73) Assignee: Nettoken Limited, London (GB)

( * ) Notice: Subject to any disclaimer, the term of this patent is extended or adjusted under 35 U.S.C. 154(b) by 0 days.

(21) Appl. No.: 15/137,086

(22) Filed: Apr. 25, 2016

(65) Prior Publication Data

US 2016/0315931 A1 Oct. 27, 2016

(30) Foreign Application Priority Data

Apr. 23, 2015 (GB) .................................. 1506954.5

(51) Int. Cl.
| | |
|---|---|
| *H04B 5/00* | (2006.01) |
| *H04W 4/80* | (2018.01) |
| *H04L 29/06* | (2006.01) |
| *G06F 21/34* | (2013.01) |
| *G06F 21/62* | (2013.01) |
| *G06F 21/77* | (2013.01) |

(Continued)

(52) U.S. Cl.
CPC .............. *H04L 63/08* (2013.01); *G06F 21/34* (2013.01); *G06F 21/6218* (2013.01); *G06F 21/77* (2013.01); *G06Q 20/3278* (2013.01); *G06Q 20/34* (2013.01); *H04B 5/0056* (2013.01)

(58) Field of Classification Search
CPC . H04L 63/08; H04L 29/06755; H04B 5/0031; H04W 4/008; H04W 12/06
See application file for complete search history.

(56) References Cited

U.S. PATENT DOCUMENTS 6,285,295 B1 9/2001 Casden
8,777,115 B2 7/2014 Ledevehat
(Continued)

FOREIGN PATENT DOCUMENTS

CA 2862507 A1 8/2013
DE 19737565 3/1999
(Continued)

OTHER PUBLICATIONS

Intellectual Property Office of Great Britain Examination Report in connection with GB1607130.0 which published on Dec. 28, 2016.

*Primary Examiner* — Andrew Wendell
(74) *Attorney, Agent, or Firm* — Timothy M. McCarthy; Clark Hill PLC

(57) ABSTRACT

A contactless communications device (10) comprises one or more near-field communication (NFC) chips (28) each configured to store information and be read by a corresponding NFC reader. The device also comprises a selection means (14) for selectively activating one or more of said chips. In use, a said NFC reader can read information from one or more of said chips only when selected and activated and when in NFC reading range. The communications device is further configured to permit data to be read from one or more of said chips only when an authentication, such as an authentication sequence, is performed utilizing the selection means in range of a said NFC chip reader.

19 Claims, 20 Drawing Sheets

(51) Int. Cl.
*G06Q 20/34* (2012.01)
*G06Q 20/32* (2012.01)

(56) References Cited

U.S. PATENT DOCUMENTS

| | | | |
|---|---|---|---|
| 8,818,867 B2 | 8/2014 | Baldwin et al. | |
| 8,914,863 B2 | 12/2014 | Prchal | |
| 8,977,569 B2* | 3/2015 | Rao | G06Q 20/341 705/41 |
| 2006/0135207 A1* | 6/2006 | Kahlman | G06K 7/0008 455/558 |
| 2007/0109101 A1 | 5/2007 | Colby | |
| 2008/0021824 A1 | 1/2008 | Kranzley | |
| 2009/0065571 A1 | 3/2009 | Jain | |
| 2009/0065587 A1 | 3/2009 | Phillips | |
| 2009/0101720 A1* | 4/2009 | Dewan | G06K 19/07345 235/492 |
| 2010/0052912 A1* | 3/2010 | Arneson | G06K 19/07345 340/572.7 |
| 2010/0328029 A1 | 12/2010 | Kolek | |
| 2013/0288594 A1* | 10/2013 | Yeh | H04W 12/04 455/26.1 |
| 2014/0067682 A1* | 3/2014 | Song | H04L 63/0853 705/44 |
| 2014/0330626 A1 | 11/2014 | Fisher | |
| 2014/0333419 A1 | 11/2014 | Zehler | |
| 2014/0361872 A1 | 12/2014 | Garcia et al. | |
| 2014/0364085 A1 | 12/2014 | Garcia | |
| 2014/0365370 A1 | 12/2014 | Huang et al. | |
| 2015/0012305 A1* | 1/2015 | Truskovsky | G06Q 10/02 705/5 |
| 2015/0017914 A1* | 1/2015 | Dua | H04M 1/7253 455/41.1 |
| 2016/0180210 A1* | 6/2016 | Spears | G06K 19/0723 235/492 |
| 2017/0077589 A1* | 3/2017 | Finn | H01Q 1/2225 |

FOREIGN PATENT DOCUMENTS

| | | |
|---|---|---|
| DE | 102011121342 | 6/2013 |
| EP | 2364006 B2 | 6/2013 |
| EP | 2811725 A1 | 12/2014 |
| JP | 2006048096 | 2/2006 |
| JP | 2009217537 | 9/2009 |
| KR | 101135388 | 4/2012 |
| WO | 2010118947 | 10/2010 |

* cited by examiner

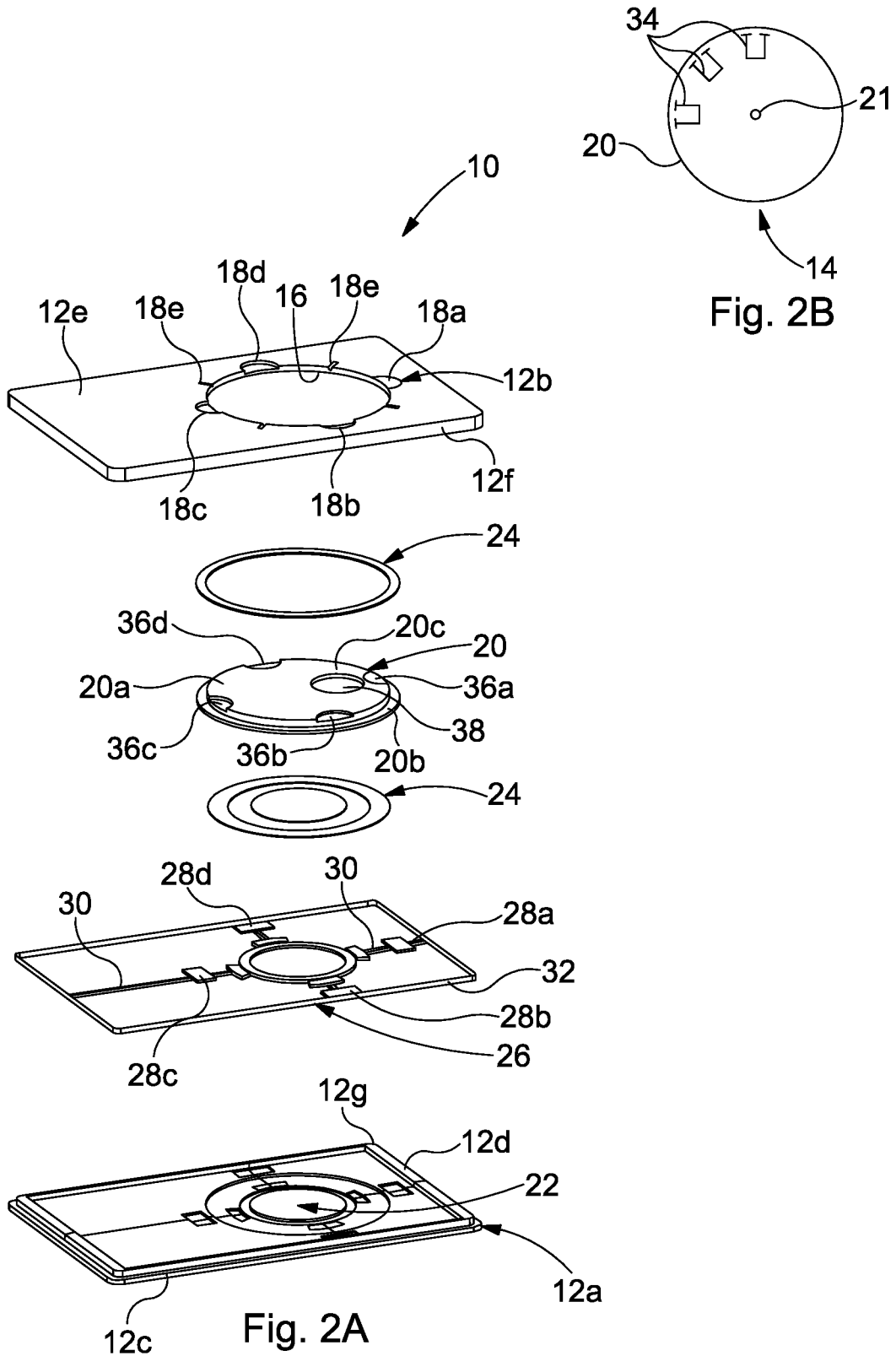

COMMUNICATIONS DEVICE, SYSTEM AND METHOD

TECHNICAL FIELD

The present invention relates to a communications device and, in particular but not exclusively, to a wireless or contactless communications device with authentication. The present invention also relates to a system incorporating the device, a method of using the device, and a non-transitory computer-readable medium

BACKGROUND TO THE INVENTION

Near field communication or NFC-enabled devices are becoming increasingly popular and "contactless" smartcards allow for quick and simple transactions to take place.

Passive NFC operates according to magnetic induction. A NFC device reader emits a small electric current which creates a magnetic field. When a NFC-enabled device is in range of that field, a coil in the NFC-enabled device converts the detected magnetic field to an electrical signal to enable the communication of data. The NFC-enabled device makes use of the energy from the reader to enable the transaction to take place. Alternatively, active NFC devices incorporate their own power source.

For example, "Oyster" cards are frequently used to travel on public transport in London. An Oyster card user simply holds the card up to a dedicated card reader and, when within the required range (approximately 80 mm), an electromagnetic field of the reader activates a radio-frequency identification (RFID) system of the card and allows data to be read from it. The system is configured to provide encryption such that only readers that have been configured to do so can read specified information from the cards.

Similar technology has been implemented to enable financial payments, allowing a user to present a payment card such as a credit or debit card to a specially configured card reader to enable a financial transaction to take place. Again, a card is provided with an RFID system having an embedded chip and antenna enable. When a user brings their card near enough to a reader, the payment is made. Generally speaking, no signature or PIN verification is needed, meaning that transactions can take place faster than the more traditional chip-and-pin payments.

Although it is clearly desirable for transactions, be they financial or otherwise, to be able to occur quickly, security of data is still a concern. Whilst card/reader systems can be provided with a level of security and/or encryption, this is out of the card holder's control. In principle a user could pass near an unauthorised card reader and inadvertently have information read/payment taken from the card. There is therefore a need for an additional level of security, controllable by the user. Additionally, as more and more transactions are being conducted in a contactless manner, there is a need for a system that can help a user better manage the data that is needed to partake in those interactions.

Aspects and embodiments of the present invention have been devised with the foregoing in mind.

SUMMARY OF THE INVENTION

According to an aspect, there is provided a contactless communications device comprising one or more near-field communication (NFC) chips each configured to store information and be read by a corresponding NFC reader. The device may comprise a selection means for selectively activating one or more of said chips. In use, a said NFC reader may read information from one or more of said chips only when selected and activated and when in NFC reading range. The communications device may be configured to permit data to be read from one or more of said chips when an authentication is performed utilising the selection means in range of a said NFC chip reader.

According to a first aspect of the present invention there is provided a communications device as defined in claim 1.

According to a second aspect of the present invention there is provided a system comprising a device according to the first aspect and a NFC reader configured to read data therefrom.

According to a third aspect of the present invention there is provided a method for using a wireless communications device comprising one or more near-field communication (NFC) chips each configured to store information and be read by a corresponding NFC reader, the method comprising operating a selection means to selectively activate one or more of said NFC chips to enable information to be read therefrom only when said selected chip is activated and when in NFC reading range.

According to a fourth aspect of the present invention there is provided a non-transitory computer-readable medium for the wireless communications device of the first aspect having computer-executable instructions for receiving a wireless signal from the communications device when the selection means is in a predefined position relative to one or more of said NFC chips to enable information to be read therefrom.

According to another aspect of the present invention there is provided a method of using a contactless communications device according to the first, second or third aspect, the method comprising reading preliminary data from the device, determining if an authentication is required, determining whether a valid authentication has been provided and, if so, permit data to be read from the device.

According to another aspect of the present invention there is provided a method of sharing information between first and second users having devices and/or systems according to the first or second aspect. The method may comprise providing consent from a first user to a second user for said second user to use specified information stored in/on the device/system of the first user. The method may comprise the first device/system and second device/system identifying each other as contacts, the contact that is made providing authorization for the second device/system to read and/or use information that is stored on the first device/system.

Aspects and embodiments of the invention advantageously provide a wireless, contactless device for storing and managing data items that may be from multiple sources and of multiple types. The ability to store such data in a single place, on a single device, is convenient for a user, whilst still providing a level of security to protect the data stored on the device. The requirement to select and/or activate a relevant chip on which relevant data is stored provides additional security over known contactless cards. A user can choose on which chip(s) data is stored. The information that is stored and readable may be or comprise the identification number of the chip. It may instead or additionally be other information. The information may be or comprise user information such as account details (e.g. bank, website accounts etc.), travel information (e.g. permits to travel, journey/flight details etc.), booking information (e.g. for a hotel).

The communications device may be, be integrated into or be configured to be connectable to another portable electronic device such as a mobile phone, accessory for a phone, tablet etc. In an embodiment, the communications device is integrated into a phone or other device e.g. in a housing or cover for the phone or other device. Alternatively, it may be a separate entity sized and shaped to be physically and/or electronically attachable to a phone or other device.

The communications device may be configured to enable information to be read from one or more of the chips only when the selection means is placed in a specific or predefined position relative to one or more of the NFC chips. The device may be configured to enable data to be read therefrom when positioning of the selection means creates an electrical connection that allows such reading of data in the vicinity of a NFC reader. The communications device may further comprise a first electrically conductive contact, and the selection means may comprise a second electrically conductive contact or be otherwise configured to provide an electrical connection to the first electrically conductive contact, to complete an electrical circuit for one or more of the NFC chips when the selection means is placed in a predefined position. The NFC chips may be connected in parallel in a circuit, each having an open electrical contact. When the selection means is placed in a specific or predetermined position with respect to an open contact of a chip, electrical contact can be made to complete the circuit.

The selection means may be moveable with respect to and in the plane of the communications device. The selection means may be rotatably or slidably moveable with respect to and within the plane of the communications device. The one or more NFC chips may be provided and/or embedded on or within a housing or substrate. The selection means may be moveable with respect to the housing.

Aspects and embodiments of the invention provide a device operable through gesture-based authentication. The selection means may be mechanical and/or configured to be moveable relative to the one or more NFC chips to select one or more of the chips. The selection means may comprise a dial mounted for rotatable movement, or a slider mounted for linear movement, with respect to and preferably in the plane of the device or housing. Other selection means, again preferably moveable in and/or with respect to the plane of the device and/or housing may also be used. Alternatively, the selection means may be electronic, and may e.g. comprise at ouch screen. The electronic selection means may therefore be configured to respond to a user's digit performing a rotatable movement, or a sliding movement thereon. In either case, it is an advantage that it is not necessary to have to, for example, apply pressure in order to complete the electrical connections e.g. as in some known electrical switches.

The NFC chip(s) may be programmable and may also be reprogrammable. The chip(s) may be configured to store just one or a plurality of data items, with one or more of the data items that can be read when the NFC chip is connected to the circuit and is in range of an NFC reader. The device may be configured for two-way communication with a user, and for two-way communication with a NFC reader.

The device may be configured to permit data to be read from one or more of the chips only when an authentication has been performed utilising the selection means in range of a NFC chip reader. The authentication may comprise a series or sequence of movements of the selection device to activate, in a specified or predefined order, one or more of the NFC chips. The authentication sequence may contain selecting the chip from which data is to be read. This chip may be selected at the beginning or end of, or elsewhere during, the sequence. The authentication advantageously provides additional security to prevent a user inadvertently making a payment when passing nearby a NFC reader, for example. It may also help protect against identity theft as a person improperly acquiring or using someone else's device will not know the authentication or the "trigger" or "read" chip on which data is stored. Movement of the selection means thus triggers activation, recognition and/or reading of one or more chips in the presence or vicinity of a NFC reader. The specific or predefined sequence may be set by the manufacturer/distributor of the device or by a user. The sequence may be reprogrammable. Reprogramming the sequence may be subject to an authorization check that reprogramming is allowed by the user or other parties.

The authentication may comprise a sequence of movements of the selection device to activate, in a predefined order, one or more of the NFC chips. The sequence may comprise two, three, four, five, six, seven, eight, nine, ten or more moves to select and activate specific chips to authenticate use of the device. The sequence may involve a change of direction of the selection means and could involve other parameters such as speed of movement, duration of positioning at a specified chip etc.

At least one of the NFC chips may be configured to permit data to be read therefrom only when an authentication has been performed in range of a NFC chip reader, and at least one other NFC chip may be configured to permit data to be read without authentication. This can enable quick device use in situations where security is less important, e.g. travel on public transport, and more, authenticated, security when e.g. making a payment.

The communications device may be provided in the form of a card, e.g. similar in size to a credit-card or token.

Aspects and embodiments of the invention may provide for the combination of a communications device and an authentication and/or security sequence for activating and/or allowing reading of the card. A corresponding device reader for reading the card (under authentication if required) may also be provided. The device, authentication sequence and device reader may all be uniquely tagged or identified so as to be usable only by authorised persons. Software may also be provided for managing data stored on the device and for defining access to and/or authority for using data stored on the card. The authentication sequence, being provided by operation of the selection means/dial on the device, effectively provides a mechanical security measure, switch or lock. The device becomes operable following a contactless combination of mechanical/gestural movements.

The user, authority and outlet can therefore communicate independently of each other, and securely, in order to protect the information of the user, the authority or the outlet. Where 'raw information' is communicated from one party to another, this may be performed using asymmetrical encryption techniques and Public Key Infrastructure (PKI). I.e., there are two types of communication between the parties. One is specific transactions (e.g. using the device to travel on public transport). The other uses PKI to transform data required to perform the specific transaction (the travel company electronically sending ticket data to the user so he/she can download it onto their device).

In addition, since people increasingly have a large digital/internet presence, and there is a need to provide personal information online, aspects and embodiments of the present invention can facilitate knowledge and management of that digital presence by maintaining sensitive information in one place, protected by a level of security and/or authentication. In addition, having a single data storage device avoids the need to have multiple plastic cards, reducing the amount of raw materials used, the energy needed to create them, shipping costs for sending them to people etc.

Software may be provided that is executable on a computing device, for enabling a user to add data to, remove data from or edit data on one or more of same NFC chips. The software may be configured to store a user defined authentication sequence that corresponds to a sequence of movements of the selection device, for activating, in a predefined order, one or more of the NFC chips.

Aspects and embodiments of the invention provide an ability to store data in a modular manner, with the location on the device, and details of individual data items stored, being controllable and changeable by the user. The user may easily manage, edit, back-up and share information/data. Additionally, aspects and embodiments of the invention enable a person to "de-clutter" the physical and virtual keys they hold (passwords, PINs, codes etc.) by storing them all in one convenient yet secure location.

By contrast, current contactless payment protocols do not require a mechanical authentication. Current EMV (Europay, Mastercard, Visa) protocols also place a £20 limit on any and all contactless transactions, and only four transactions are allowed in quick succession. If a payment over £20 is to be made, the merchant must ask the customer to use chip and PIN. Aspects and embodiments of the present invention could therefore allow quicker authenticated payments amongst other uses.

BRIEF DESCRIPTION OF THE DRAWINGS

Embodiments of the invention will now be described with reference to the Figures of the accompanying drawings in which:

FIG. 2A shows a schematic exploded view of a communications device according to an embodiment of the present invention;

FIG. 2B shows the underside of the dial that forms part of the device of FIG. 2A;

DETAILED DESCRIPTION OF EMBODIMENTS OF THE INVENTION

Figure 1A:
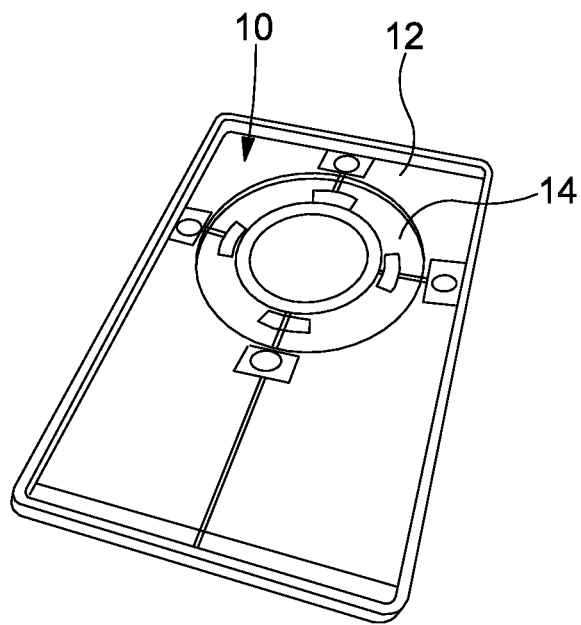
FIGS. 1A and 1B show a communications device according to an embodiment of the present invention.
Figure 1B:
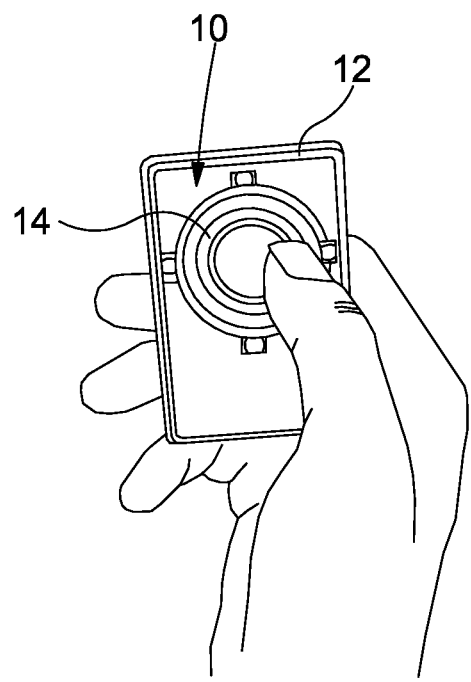

FIGS. 1A and 1B show an exemplary communications device 10. The device 10, in the embodiment shown, is a smart card. It has approximately the same dimensions as a credit card (approximately 85×54 mm). The thickness of the card may be approximately 0.8 mm, similar to known NFC cards with embedded circuitry, and In accordance with ISO standards. The thickness of the card may be less, if manufacturing permits, or may be thicker e.g. up to approximately 3 or 4 mm. In other embodiments, devices of other shapes and sizes may be provided. A device that is approximately the same dimensions as a credit card is convenient since a user can store it in their wallet, like a credit card, but the invention is not limited to this and may, for example, be square or circular in area. However, tokens, fobs and the like may also be used instead of a card.

The device 10 of FIGS. 1A and 1B comprises a housing 12. In the embodiment shown, the housing 12 is transparent, but housings 12 of other opacities may also be used. A dial 14 is mounted to be moveable with respect to housing 12. A user may operate the dial 14 with a single digit. The device 10 may be operated with one hand, as shown in FIG. 1B, if the user uses their thumb. It is therefore a further advantage if the device is sized to facilitate single-handed operation, and a credit card size is particularly useful in this regard.

Referring now to FIG. 2A, the components of the device 10 according to an exemplary embodiment can be seen in greater detail. Housing 12 comprises a base 12a and a top 12b, securable together. Base 12a comprises a planar surface 12c and a lip 12d that extends around the entire perimeter thereof, but set slightly inwardly therefrom. The lip 12d extends upwardly as shown in FIG. 2A. The top or lid 12b also comprises a planar surface 12e and a flange 12f that extends therefrom (downwardly in FIG. 2A). The height of the lip 12d and flange 12f are substantially the same, or the lip 12d may be slightly shorter. As such, when the base 12a and top 12b are placed together, the flange 12f locates around the exterior of the lip 12d and the exterior of the flange 12f sits flush with the outer edge of the base planar surface 12b. One or more securing means 12g (e.g. male/female or otherwise cooperating connectors) may be provided to attach the top 12b to the base 12a, e.g. to provide a friction fit, or snap fit to resist or prevent separation of the top 12b from the base 12a. Alternatively or additionally, a sealant or adhesive may be provided between or around the base 12a and top 12b to secure the two parts together.

The top 12a is provided with a through-aperture 16. Around the circumference of the aperture 16 are provided location markers 18a-d, which will be described in greater detail below.

The dial 14 is provided between the base 12a and top 12b. The dial 14 comprises a disc 20a, the diameter of which is slightly greater than that of the aperture 16 in the housing top 12b. The thickness of the dial 14 around the perimeter 20b thereof may be less than the central portion 20c. The central portion 20c has a diameter the same as, or slightly less than that of the aperture 16 such that it is locatable therein. The underside of the dial 14 shown in FIG. 2B is provided with a small indentation or dimple 21 in the centre that is locatable on a pin 22 provided on the interior surface of the base 12a. When the top 12b is attached to the base 12a, the dial 20 is thus supported within the housing 12 and is rotatable on pin 22. One or more low friction members, such as thin Teflon® rings, may be provided on one or both sides of the dial 20a to facilitate smooth rotation of the dial 20 within the housing 12. The base 12a may comprise a shallow circular indentation approximately the same size as, or slightly larger than, the diameter of the dial 20, to assist in locating the dial 20 in the correct position. As can be seen at the bottom of FIG. 2A, the base 12a may comprise further mouldings to accommodate circuitry 26 (discussed below).

The housing 12 and dial 14 are preferably formed of a rigid plastics material, e.g. PVC as is used for known NFC cards.

Circuitry 26 is provided within the housing 12. The circuitry 26 comprises one or more near field communication (NFC) chips 28 with RFID or like capabilities. In the embodiment shown, four chips 28a-d are used, but any other number of chips could be employed. Here, the four chips are spaced 90° from each other around the circular indentation of the base 12a. Preferably the chips 28 are positioned along the longitudinal and lateral axis of the base 12a, i.e. at north, south, east and west (or 12 o'clock, 3 o'clock, 6 o'clock and 9 o'clock) positions. Each chip 28 is preferably programmable and/or reprogrammable. Where multiple chips 28 are included, each has its own unique identification number (UID), e.g. a standard ISO 14443 UID number that is assigned during manufacture. This is not editable by the user.

Figure 3:
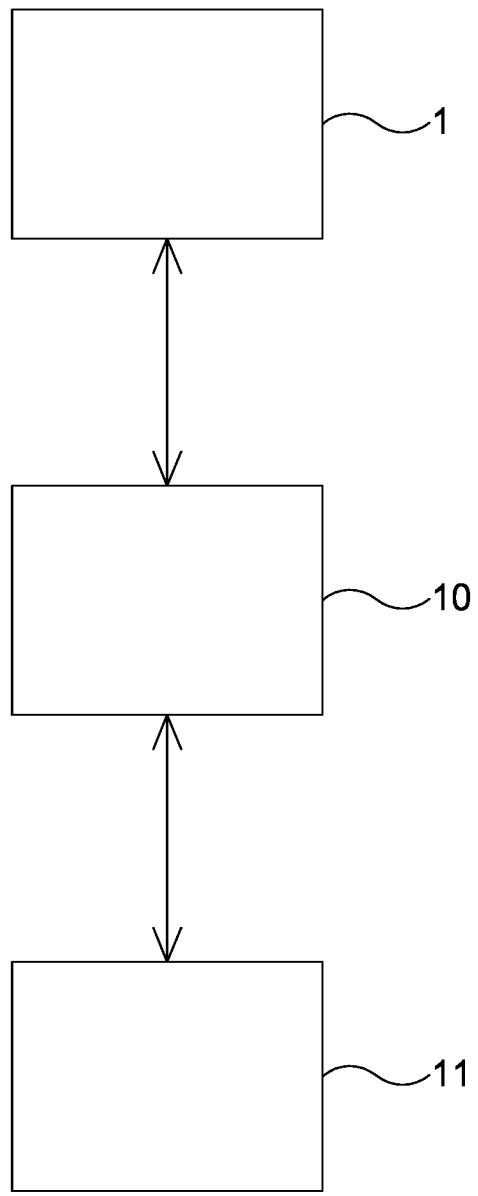
FIG. 3 shows a schematic view of interactions between a user, a device according to embodiments of the invention and a NFC reader.

The chips 28 are connected by copper wire 30 to a coil 32. As will be discussed in greater detail later, each chip 28 has two open contacts such that the circuit 26 is only completed through alignment with a complementary conductive contact 34 provided on the underside of the dial 20. In the embodiment shown, three contacts 34 are provided, each of which is configured to be able to complete the circuit 26 when aligned with the open ends of the circuit at each chip 28. When the circuit 26 is completed, and is in range of a suitable NFC reader, data can be read from the device 10. Preferably the NFC chips 28 used are passive NFC chips, enabling data to be read through magnetic induction, as described above. The use of passive NFC chips advantageously means that it is not necessary for the device 10 to comprise a power source. This, in turn, allows wireless, contactless communication. In alternative embodiments, the device 10 could be provided with its own power source and thus work with other active NFC devices. FIG. 3 provides a simple schematic illustration showing a user 1, a contactless device 10 and an NFC terminal 11. The user 1 can physically interact with the device 10 to operate it, and the device 10 communicates with the terminal 11 via NFC.

Returning again to FIG. 2A, the upper surface of the housing top 12b comprises markings or indentations 18 spaced 90° from each other. As such, four indentations 18a-d are provided, preferably aligned along the longitudinal and lateral axes of the housing top 12b. The positions of the indentations 18a correspond to the positions of the chips 28.

The upper surface of the dial 14 is also provided with one or more markings or indentations 36, which preferably correspond to the markings 18a on the top housing 12b. One or more of the contacts 34 is preferably provided adjacent to, and in a similar position as, an indentation 18a, but on the underside of the dial 14. As such, when an indentation 36 is aligned with an indentation 18a, the contact 34 completes the circuit 26 for one of the chips 28 enabling the chip to be read by a NFC reader when in reading range. As will be discussed later, the provision of more than one contact 34 also makes it possible for more than one chip 28 to be connected to the circuit at any one time.

A thumb or finger guide in the form of an additional indentation 38 may also be provided on the upper surface of the dial 20, to facilitate use of the dial 14.

Although the foregoing describes markings or indentations 18, 36, it should be appreciated that other ways of ensuring alignment between the dial 20 and the housing 12b are also envisaged. For example, detents, markings such as lines, or text, or a symbol etc., or a protrusion or other raised feature may equally be used. The dial 14 and housing 12 may be configured with interacting features and/or electronics to provide "tactile clicks" or some other visual and/or audible indication that a chip 28 has been selected.

It will be appreciated that this is an exemplary embodiment only, and different configurations and/or implementations could be employed. In particular, the physical configuration as shown in and described in relation to FIG. 2A may be any "housing" component with a mechanical lock means moveable (e.g. rotatable or slidable) with respect thereto. The rotatable, slidable etc. "mechanism" may be provided as an electronic and/or digital mechanism. For example, a touch screen could instead be provided responsive to a user's gestural commands. The touch screen could be configured to respond to movements similar to those described above, e.g. rotating a virtual dial, or moving a virtual slider relative to positions marked on the top of the device and/or touch screen itself.

Figure 4A:
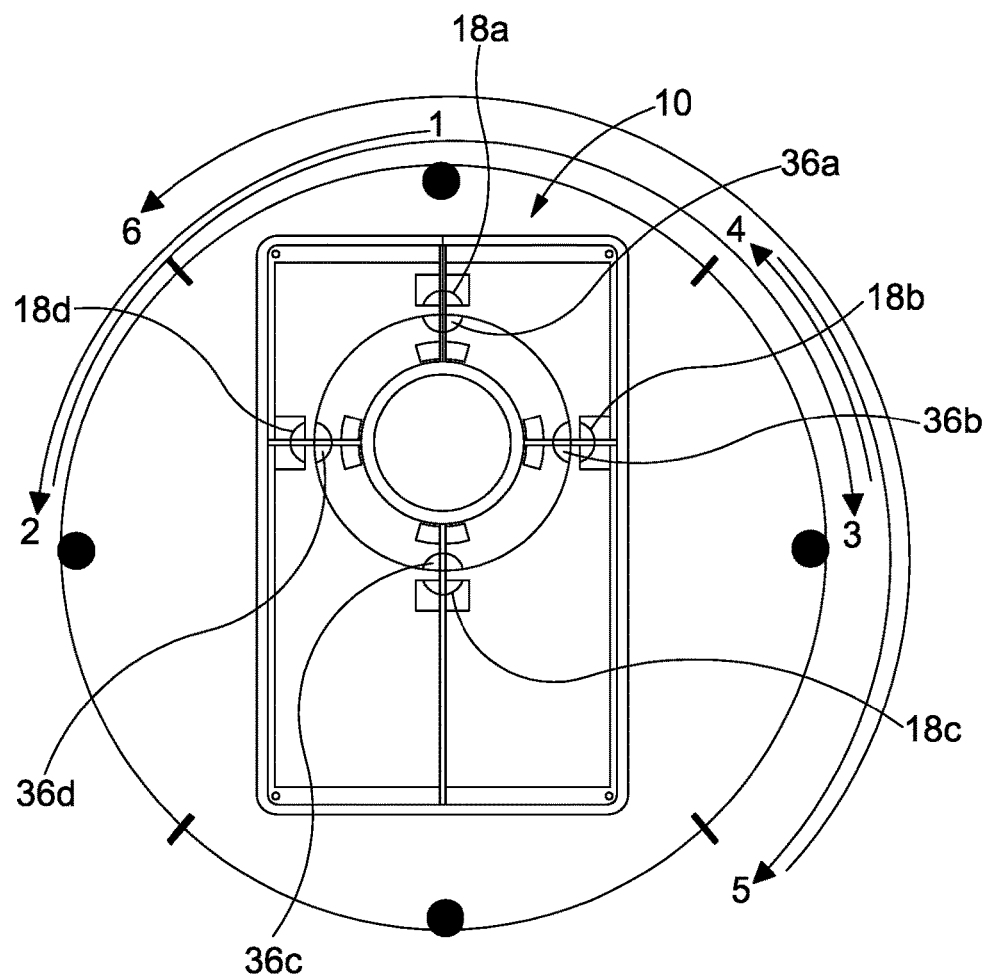
FIG. 4A shows a schematic view of a communications device according to an embodiment of the present invention indicating device read positions.
Figure 4B:
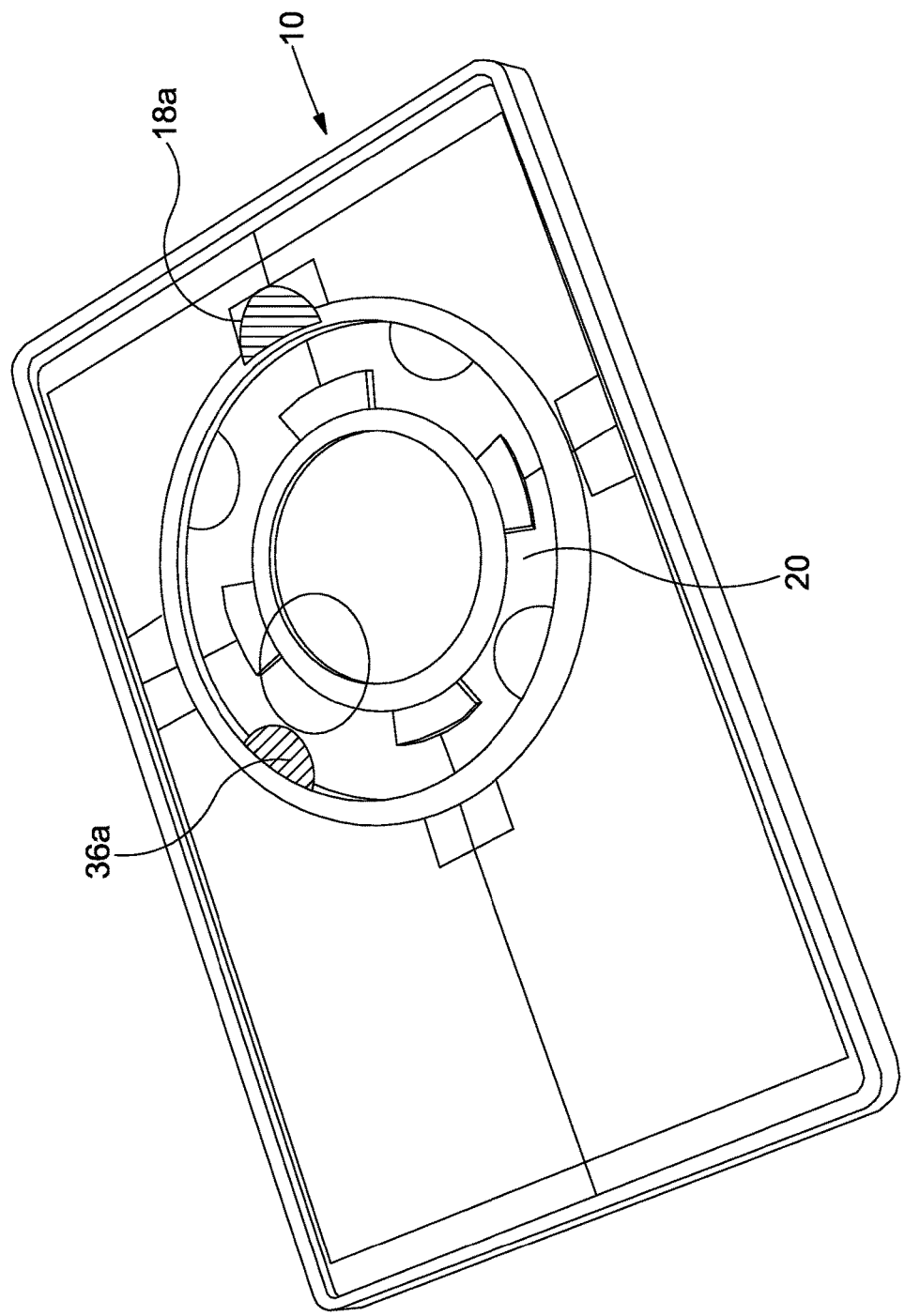
FIG. 4B shows a communications device according to an embodiment of the present invention.

FIG. 4A illustrates use of the device 10. The sequence starts with markings 18a and 36a; and 18b and 36b; and 18c and 36c; and 18d and 36d aligned. (As shown in FIG. 4B, the markings 18a, 36a may be configured differently, e.g. coloured or textured or otherwise configured to be the same to help a user easily identify the starting position.) The user then rotates the dial 14 to place it in a series of predefined positions in order to bring one or more of the contacts 34 into line to complete the circuit for one or more of the chips 28. In the example shown, the starting position is depicted as '1'. The user then rotates the dial 14 90° to the left to position '2', where marking 36a would align with marking 18d. Position '3' is then 1800 to the right, so marking 36a is aligned with marking 36b. Position '4' is 45° to the left, with marking 36a aligned at a point half way between markings 18a and 18b. Position '5' is a 90° rotation to the right, to a point halfway between markings 18b and 18c and, finally, position '6' is a 180° rotation to the left to a point halfway between markings 18d and 18a. The 'halfway' positions are marked generally as 18e in FIG. 2A. It will be appreciated that other positions could be chosen for relative alignment between the dial 14 and the housing 12. It will also be appreciated that the authentication sequence may comprise any number of contact positions. Five or six (as in the embodiment shown in FIG. 4A or 4B) is convenient as it is not too long a sequence for a user to have to remember or perform, but still provides security since it is unlikely that all of these predefined contacts will be achieved in the correct order by chance when the device 10 is in range of a reader. As such, one predefined contact may be unlikely to be secure, but two, three, four, or seven, eight, nine, ten or more may also be used.

A 'traditional' 4-digit PIN code comprising of digits 0 through to 9, or with 10 unique digits, where the order of digits is relevant and repeating digits is allowed has 10,000 possible unique permutations. By contrast, and by way of an example, an authentication sequence comprising 5 or more digits, comprising of positions at 8 compass points, or 8 unique positions, e.g. using the arrangement shown in FIG. 4A or 4B, where the order of digits is relevant and repeating digits is allowed, provides for over 30,000 unique permutations. When including the handedness of rotations in the combination sequence, i.e. measuring clockwise or anti-clockwise turns, the number of permutations doubles to over 60,000 as the handedness of subsequent moves is opposite to the previous move in the authentication sequence—like a mechanical combination lock—thus doubling the number of permutations.)

It is possible, and more secure for the software reading the authentication sequence, to read all NFC chips 28 that the rotating movement 20 passes over, allowing handedness to be measured. For example, an authentication sequence that has a clockwise move that goes from North to South (N-S), will actually read N-NE-E-SE-S. The counter clockwise equivalent is N-NW-W-SW-S. I.e. detecting the chips 'in between' the target chips to be read is a feature of the authentication sequence that makes it more robust.

Figure 5A:
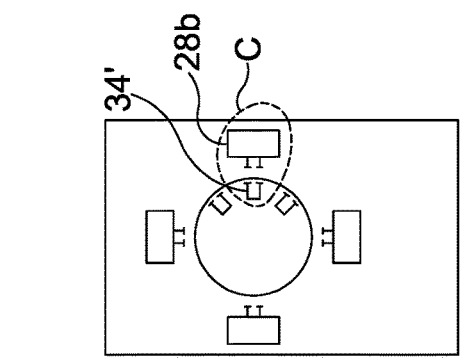
FIGS. 5A to 5H show schematically different read/authentication positions of a communications device according to an embodiment of the present invention.
Figure 5B:
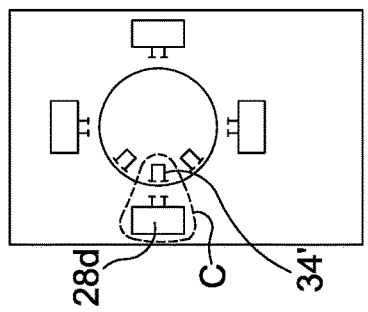
Figure 5C:
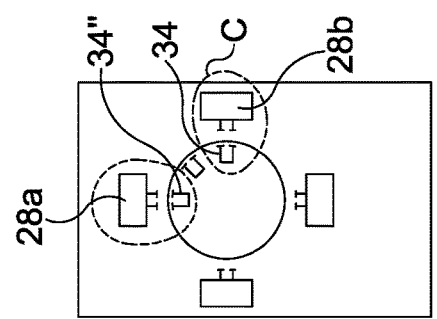
Figure 5D:
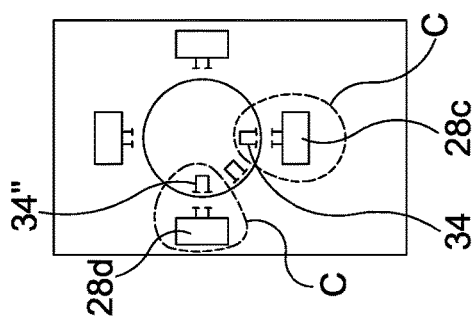
Figure 5E:
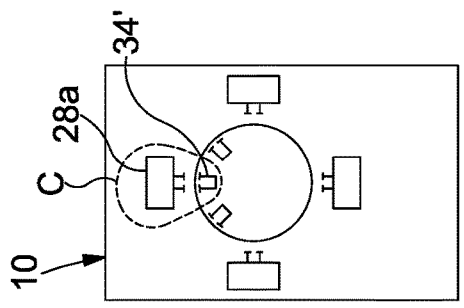
Figure 5F:
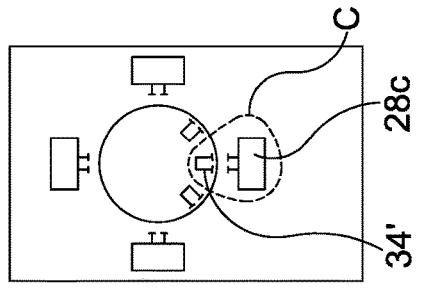
Figure 5G:
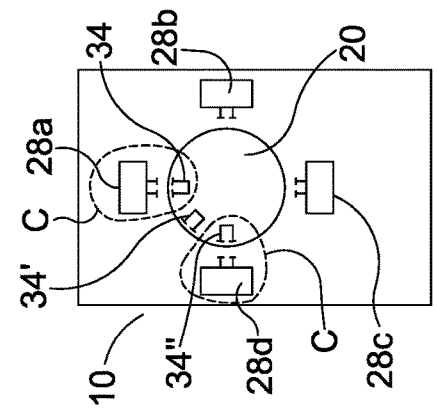
Figure 5H:
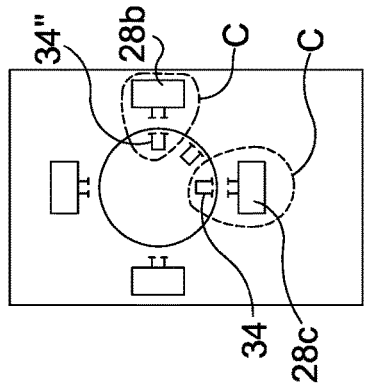

FIGS. 5A to 5H show an example of how circuit connections "C" are achieved through rotation of the dial 14. In FIG. 5A, the dial 14 is in an initial position, e.g. with marking 18a aligned with marking 36a as shown in FIG. 4A. Here, dial contact 34 is aligned with the open contacts of chip 28a and dial contact 34" is aligned with the open contacts of chip 28d, such that both chips 28a and 28d are connected to the circuit 26. When in range of a reader (not shown), the reader could identify and read either or both chips 28a, 28d through their unique identification numbers. Chips 28b, 28c are not connected to the circuit 26 and cannot be read when the dial is in this position. Rotation of the dial 14 by 45° to the right puts the device 10 into the position shown in FIG. 5B. Here, dial contact 34' is connected to chip 28a only. Rotation of the dial 14 by a further 45° places the device 10 into the configuration of FIG. 5C. Here, chip 28a is connected to the circuit 26 via dial contact 34" and chip 28b is connected to the circuit 26 via contact 34. In FIG. 5D, after rotation of the dial 14 by another 45°, only chip 28b is connected to the circuit 26 via dial contact 34'. Another rotation of 45° to the position shown in FIG. 5E connects chip 28b to circuit 26 via contact 34" and chip 26c via contact 34. A further 45° rotation as shown in FIG. 5F connects chip 28c with contact 34' to complete circuit 26. In FIG. 5G, after another 45° rotation, chips 28c and 28d are connected to circuit 26 via contacts 34 and 34" respectively. Finally, as shown in FIG. 5H, a further rotation of 45° to the right puts contact 34' into connection with chip 28d. Further rotation would lead back to the position of FIG. 5A.

It will be appreciated that other ways of implementation are possible, giving a different number of positions of the dial 14 at which contact can be made. For example, a single dial contact 34 would provide four dial positions (0°, 90°, 180° and 270°) at which the circuit can be completed. Providing two contacts spaced 45° from each other on the dial (e.g. contacts 34 and 34'), rather than the three shown in FIGS. 2b and 5, would also enable eight contact positions with only one chip connected at a time (but without a way to distinguish whether contact 34 or 34' is connected. Adding more contacts could enable more chips to be connected at once when the dial 14 is in certain positions, but this may not be desirable due to potential signal clashes during reading. Having a higher number of chips evenly spaced around the device 10, and three contacts spaced so as to make contact with either one or two at a time would increase the number of permutations available.

Figure 6:
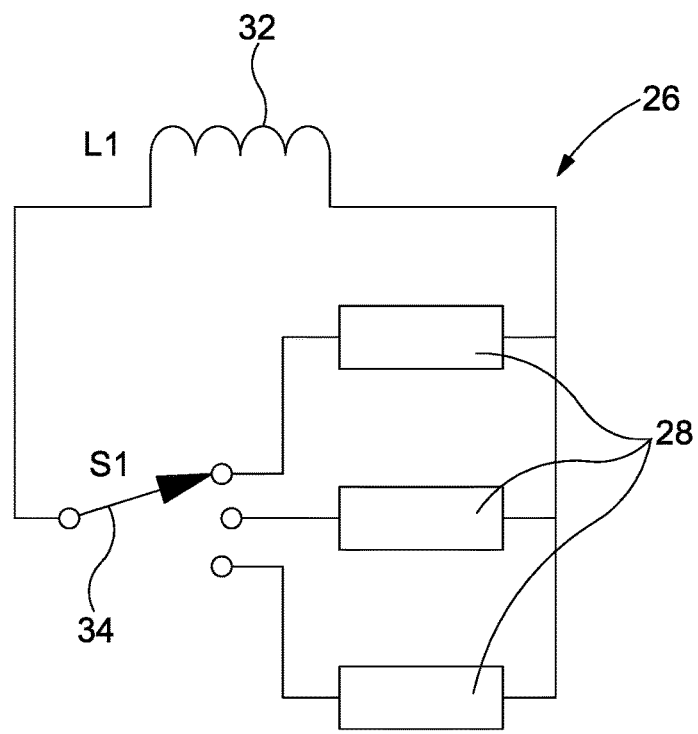
FIG. 6 shows a circuit diagram illustrating switching to place a communications device according to the present invention in a read state.
Figure 7:
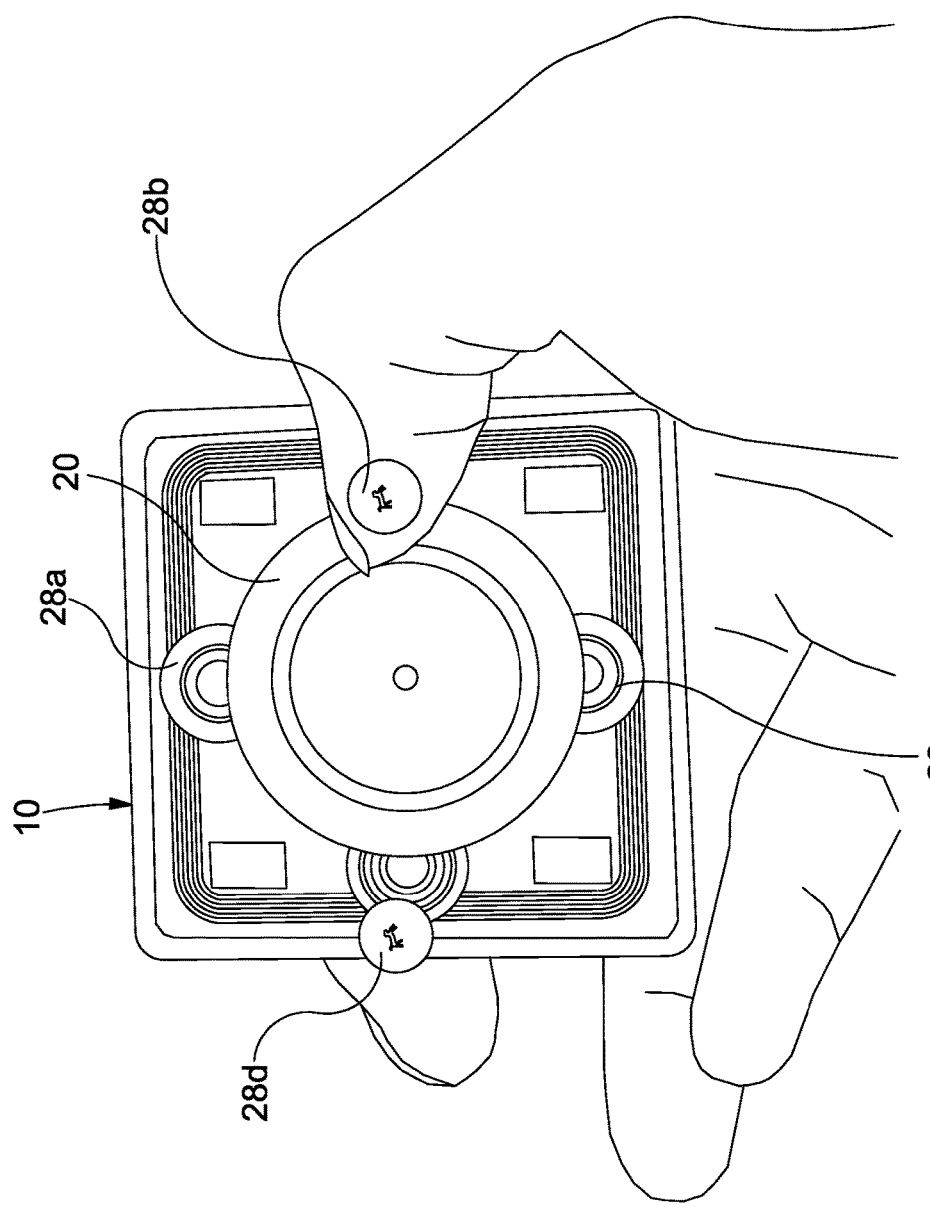
FIG. 7 depicts a device according to an embodiment of the invention in use.

FIG. 6 schematically depicts the circuit 26 and connections described above. Each chip 28—three are shown in FIG. 6, but four or another number could be used—is connected in the parallel circuit 26 to each other and to the (single) coil 32. This embodiment, for simplicity, shows only a single chip 28 connectable to the circuit at any time, but multiple chips 28 may be connected simultaneously as described above. When the card 10 is in range of the reader, it will read the chip 28 connected to the coil 32. Embodiments of the invention provide an additional level of security, however, by also requiring an authentication sequence as outlined above to be performed to permit reading of data from one or more chips 28 by a reader. For ease of use, the chip to be read (the "trigger chip") may be read e.g. at the start or end of the authentication sequence, for example. Alternatively, it may be sufficient that the chip 28 is read at any point during the authentication sequence, so long as it is included in the authentication sequence. Means could be provided to assist a user in remembering on which chip they have stored data e.g. markings or symbols or suchlike denoting themes such as travel, banking etc. If a valid authentication sequence is performed in range of a reader, the chip 28 that is then connected in the circuit can then be read. Security is provided both by the use of an authentication sequence, and through each chip 28 having a unique identification number (UID). FIG. 7 shows an example of a user selecting the chip required (28b in this example) by rotating the dial 20 to connect chip 28b to the circuit 26.

Figures 8A, 8B:
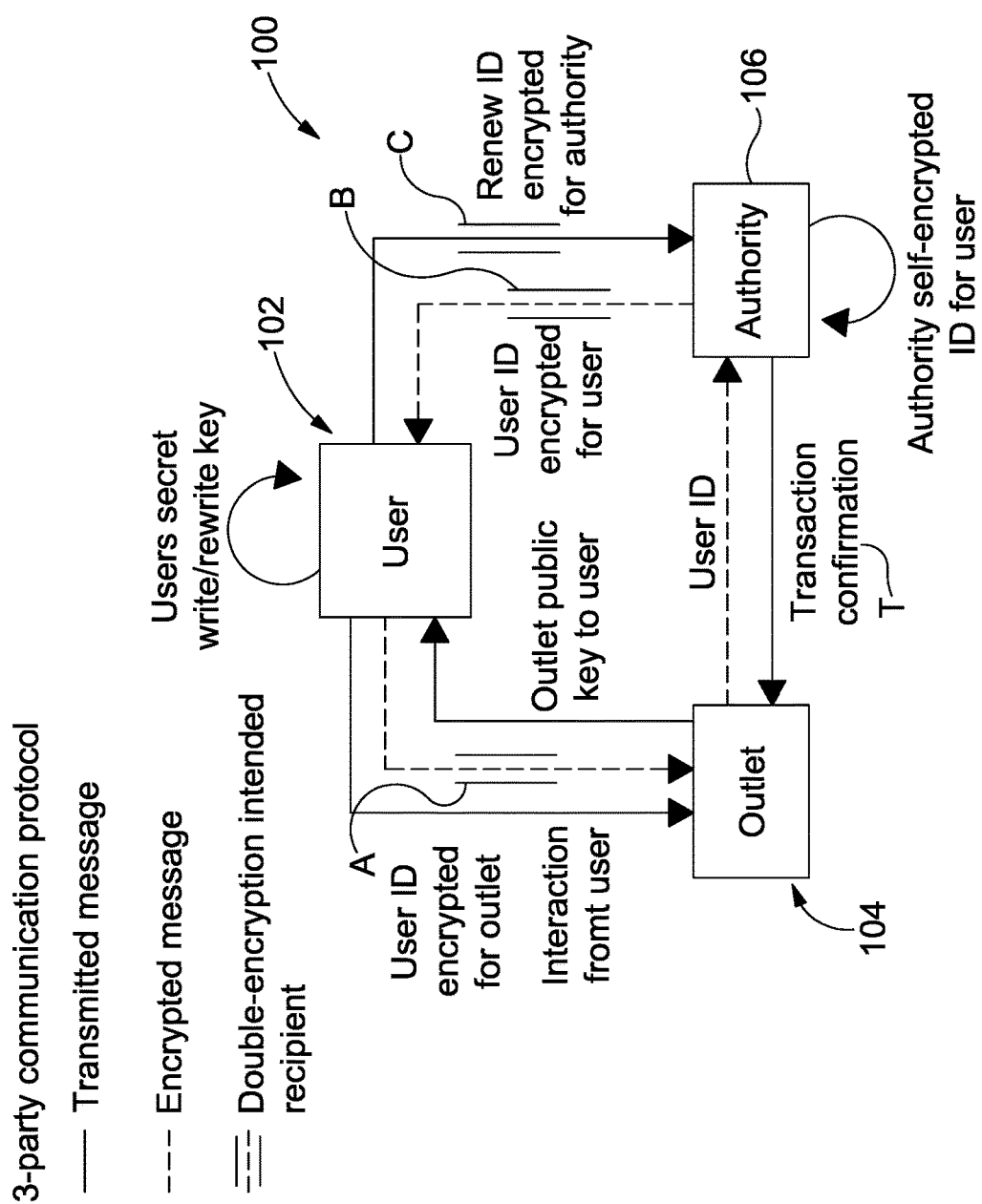
FIG. 8A is a schematic view of a system incorporating a communications device according to an embodiment of the present invention.
FIG. 8B is a schematic view of the process steps involved in using a communications device according to an embodiment of the invention to make a transaction.

In addition to the features described above, aspects and embodiments of the invention provide a system 100 and process incorporating a device 10. FIG. 8A exemplifies use of the device 10 in a transaction. Here, a user 102 wishes to make a transaction, e.g. to make a payment in a shop, login to a website, or to travel on public transport, at an outlet 104. The user 102 presents their card 10 to a reader at outlet 104. They perform their authentication sequence 'A' to permit the card reader to read data from the device 10. The card reader/outlet 104 then performs any necessary security checks with an external authority 106 (e.g. a bank or a central database etc.) to permit the desired transaction 'T' to occur.

The user 102 can also communicate directly with the authority 106. The authority 106 may have provided ('B') an encrypted user ID, PIN or other security code to enable the user 102 to conduct secure transactions. The user 102 may communicate 'C' with the authority to change that user ID. This may be done online e.g. via an application or software that can run on a computing device of the user such as a PC, tablet, mobile phone etc. As is also discussed with reference to FIG. 9 below, this method may utilise Public Key Infrastructure asymmetrical encryption methods. PKI methods are specialised encryption protocols that are widely available to the public. FIGS. 8A (and 9 discussed below) shows (with reference to the key) details of which communications are encrypted for each intended recipient in order to keep the identity-related communications secure.

FIG. 8B illustrates the process steps. At step S, the user inputs their authentication as previously described. At step S2, the authority 106 verifies and/or confirms the authentication sequence as being valid. In the event of a valid authentication sequence, the merchant or outlet 104 completes the transaction at step S3.

Figure 9:
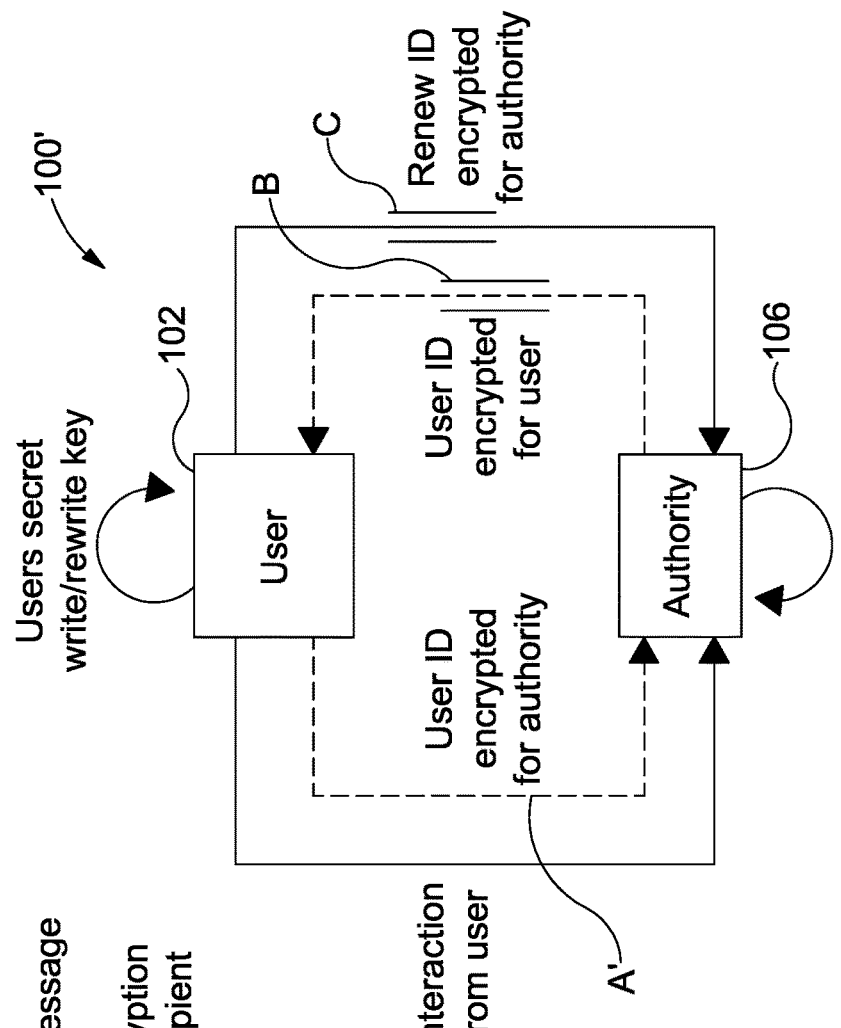
FIG. 9 is a schematic view of a system incorporating a communications device according to another embodiment of the present invention.

FIG. 9 shows an alternative system 100' that does not require the user to perform the authentication sequence to permit a card reader to read data from the device 10. For example, a user 102 may wish to have the additional security the authentication sequence provides for making financial payments, but not when travelling on a bus. The same device 10 may be used for all NFC transactions, but choose the ones for which the authentication sequence is required. As such, the system 100' does not require the authentication. Instead, when a user 102 brings the device 10 in range of a card reader, the card reader can automatically read data therefrom 'A' to enable a transaction to take place (e.g. travel on a bus or train).

In FIGS. 8A and 9, it is necessary to communicate between the user 102, authority 106 and outlet 104 independently of each other, and securely, in order to protect the information of the user 102, the authority 106 or the outlet 104. This type of communication—i.e. sending raw information from one party to another—is intended to be performed using asymmetrical encryption techniques and Public Key Infrastructure (PKI). As such, the authority 104 may have provided ('B') an encrypted user ID, PIN or other security code to enable the user 102 to conduct secure transactions. The user 102 may communicate 'C' with the authority to change that user ID. This may be done online e.g. via an application or software that can run on a computing device of the user such as a PC, tablet, mobile phone etc.

I.e., there are two types of communication between the parties. One is specific transactions (e.g. getting on a bus with an Oyster or other travel card). The other is the transformation of data required to perform the specific transaction (e.g. Oyster or another travelcard company electronically sending ticket data to the user so he/she can download it onto their device 10). The latter is using PKI.

Figure 10:
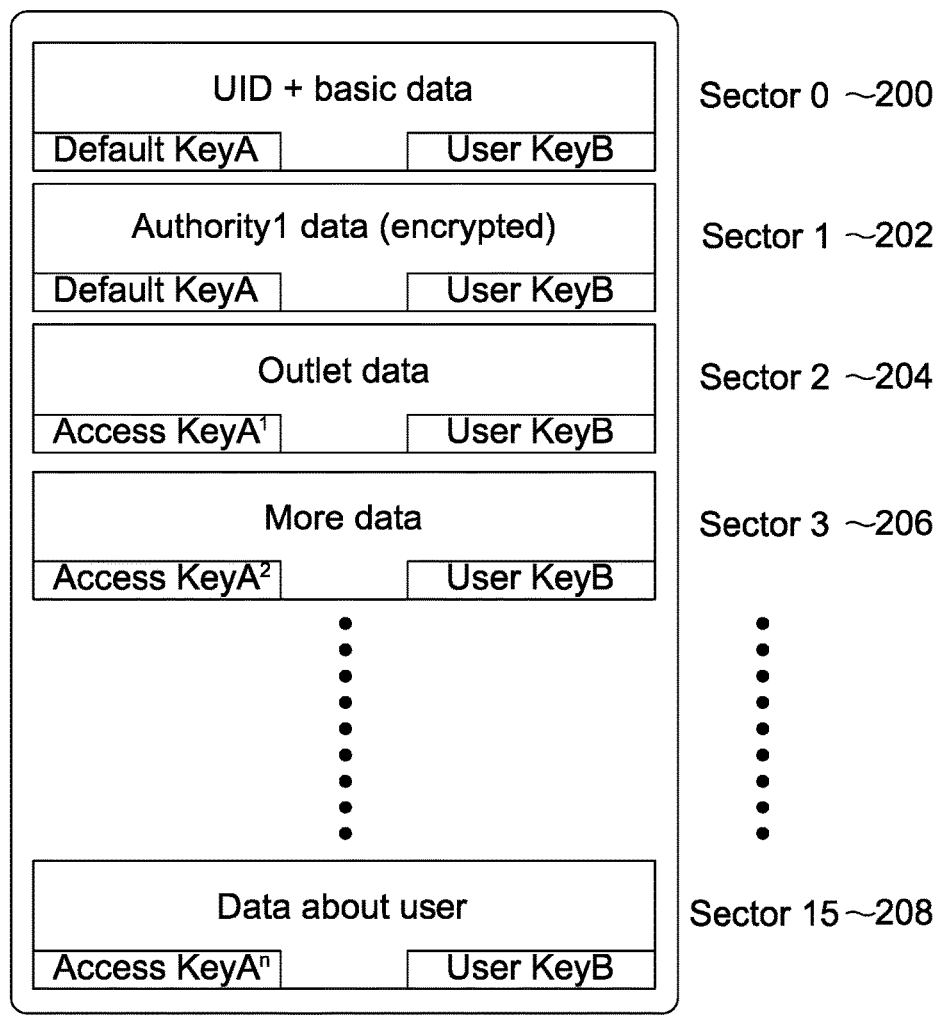
FIG. 10 is a schematic view of the data architecture of a communications device according to an embodiment of the present invention.

FIG. 10 shows an example of the data architecture of a device 10 according to an exemplary embodiment of the present invention. Data is stored on the device 10 in modules or sectors (according to ISO 14443 standards). In one sector 200 ('Sector 0' in the embodiment shown), a chip 28 stores the unique identification (UID) and basic data. The references to 'Default KeyA' and 'User KeyB' etc. refer to standard access keys under the ISO 14443 standard. Each sector can be defined to be readable and/or writable by a user. They can also be locked and rendered permanently uneditable by a user. Another sector 202 ('Sector 1') stores encrypted data relating to a particular authority (e.g. a bank or travel company). This may include a password, PIN, etc. Sector 204 ('Sector 2' in FIG. 10) stores data relating to the outlet, for example, authority data that enables a particular card reader or type of card reader (e.g. in a shop or restaurant or on a bus) to read data from the card. More data for other outlets and/or for different personal accounts etc. may be stored in additional sectors (206 . . . ). User data such as individual account numbers, vendor references or condensed account information for a user such as loyalty points or last visit or locations etc. may be stored in another sector 208 (e.g. 'Sector 15'). A data-structure standard may be provided for these applications, specifying what kind of information can be stored, in what order, how to reference different sectors if more storage is required etc.

Figure 11:
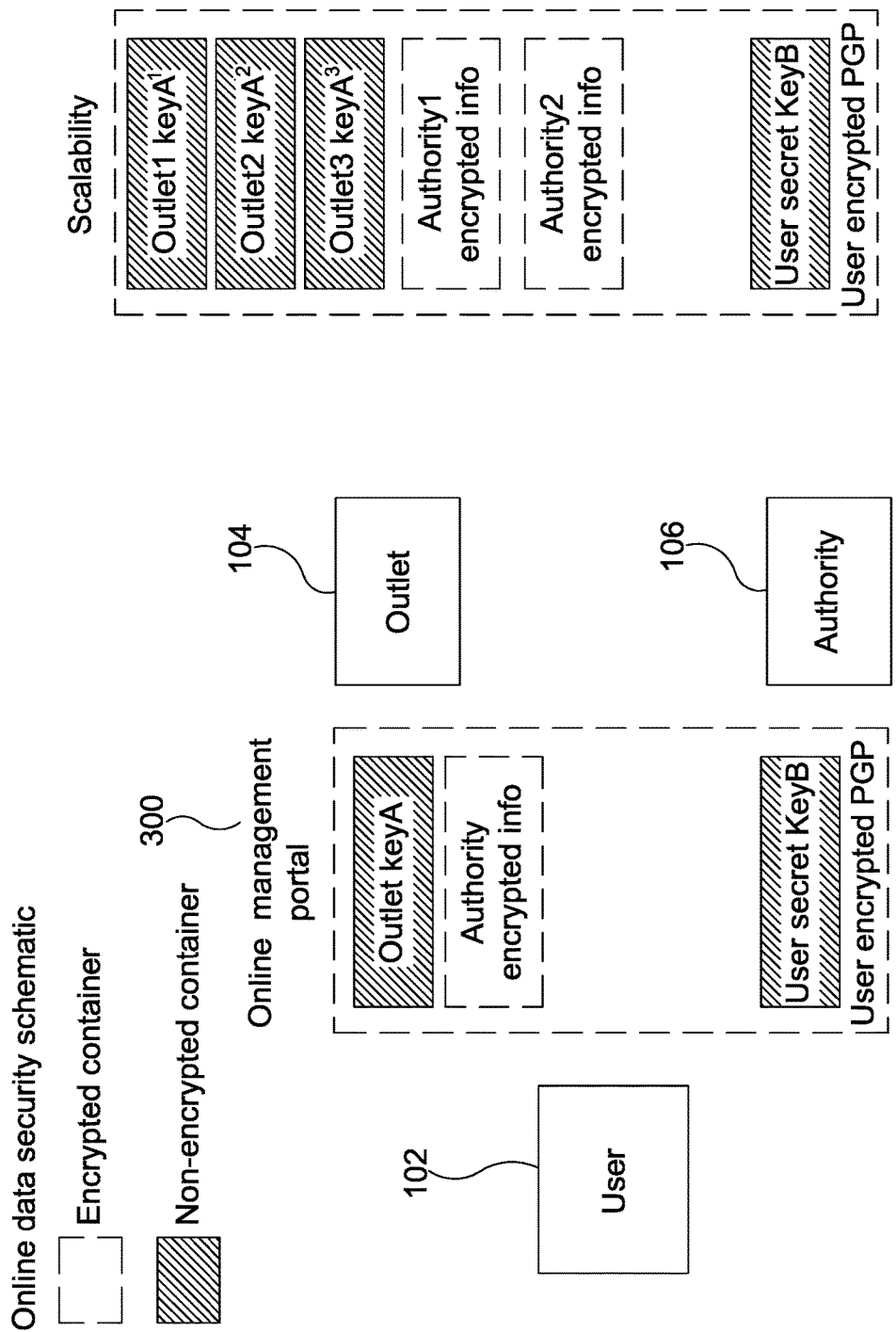
FIG. 11 shows schematically an online data security schematic for a communications device according to an embodiment of the present invention.

As mentioned above, and now referring to FIG. 11, aspects and embodiments of the invention enable the user 102 to manage data storage on their card 10 with software/an application 300. This depicts how an online platform would securely contain the information that a user has on their card. User 102, outlet 104, authority 106 and the online management portal 300 are all in communication via the internet. Outlet 104 and authority 106 are the parties that need to communicate in the presence of the user 102, to complete a transaction. The outlet 104 is provided with a customised private decryption key, for their information, and the authority, 106 (e.g. VISA, Mastercard), to embed their PKI protocol information securely on the user's card or device 10 (as discussed above in relation to FIGS. 8A and 9). All of the information is then secured with the user's 102, encryption key. The information from the authority 106 is encrypted by themselves, for themselves and is unreadable by either the outlet 104 or the user 102. The outlet's 104 information may be encrypted in a similar manner but FIG. 11 shows this unencrypted.

Figure 12:
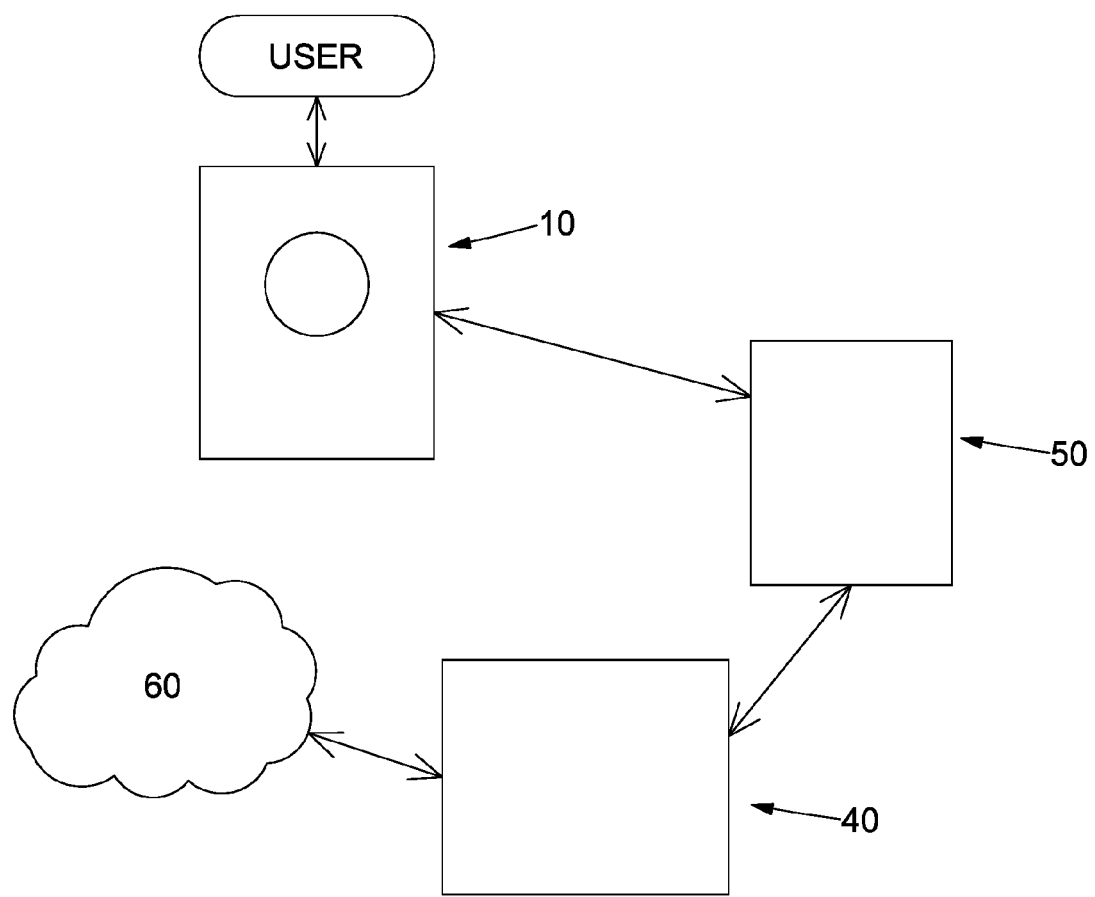
FIG. 12 shows schematically a system incorporating a device according to an embodiment of the invention.
Figure 13:
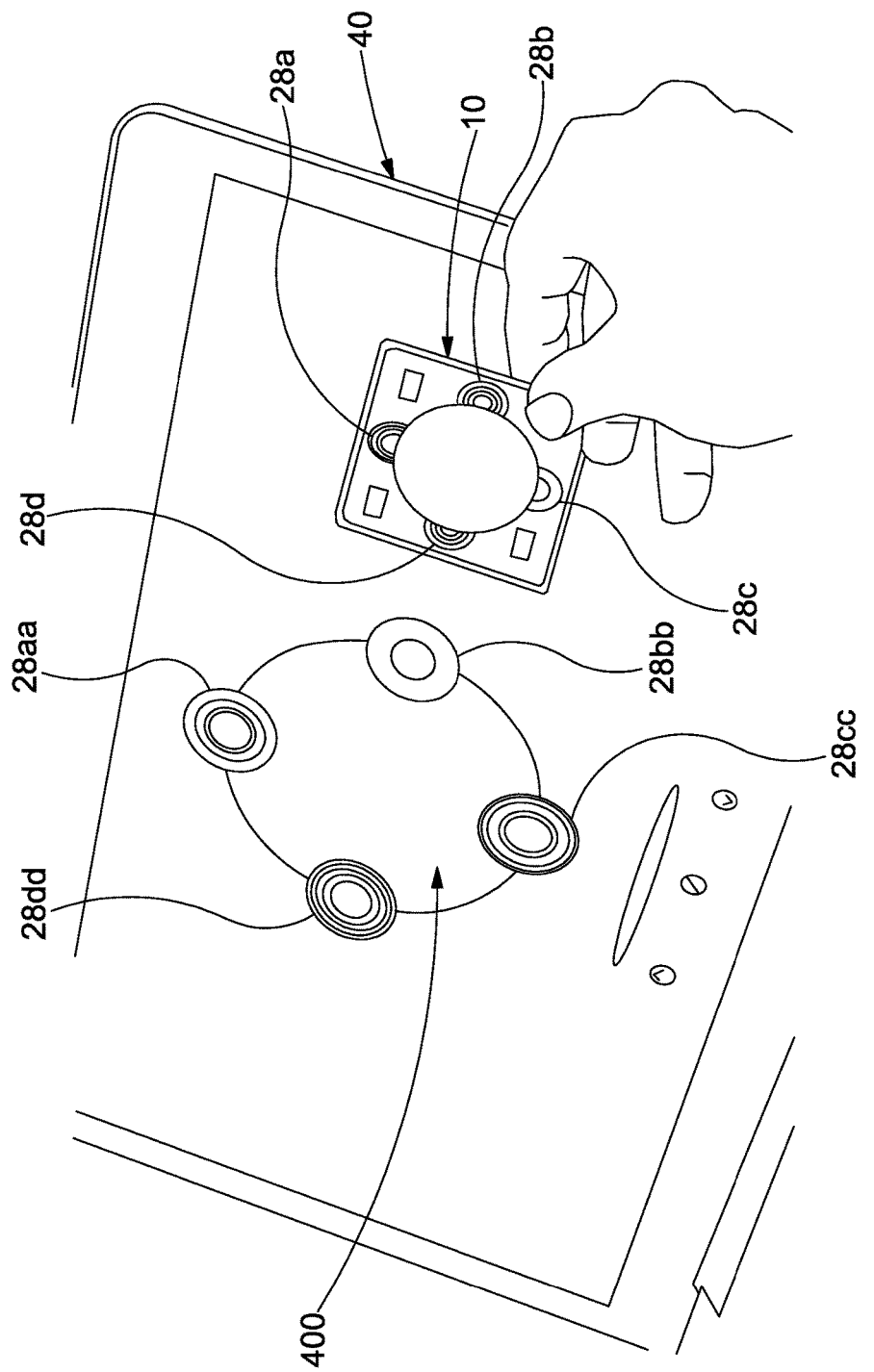
FIGS. 13 and 14 show an exemplary application for managing data held on a device according to an embodiment of the invention.

This tool 300 provides a platform that enables a user 102 to manage data on their device 10 using a computing device 40 such as a PC or mobile phone. This is achieved by the user 102 having their own NFC reader 50 that can communicate with both the card device 10 and the user's computing device, e.g. as shown in FIG. 12. The NFC reader 50 is configured for two-way communication with the device 10 and the computing device 40 which, in turn can communicate with outlets and other external authorities via one or more networks 60. In use, the user 102 will bring the device 10 into read range of the reader 50 which is connected with the computing device 40. The connection may be of any convenient form e.g. wired or wireless/contactless. The software/application 300 running on computing device 40 is configured to present information on the screen of the computing device 40 to enable the user 102 to manage information stored on the device 10. An example is shown in FIG. 13 where, conveniently, a visual representation 400 corresponding to device 10 is presented to the user 102. The device 10 may be configured to visually identify and distinguish each chip 28, and the same or corresponding visual indications may be shown by the app 300 so it is clear to the user 102 what chip 28 is being represented on the screen. The visual representation 400 is interactive and enables a user to select by any appropriate means (e.g. mouse click, cursor selection, etc.) one of the 'virtual chips' shown on the screen. In the example shown, physical chips 28a, 28b, 28c, 28d are represented on screen with graphics/icons 28aa, 28bb, 28cc, 28dd.

Of note, it is an advantage that data is stored on device 10, which is usable in isolation from any other system or device (such as a smartphone or other computer application) and does not need its own power source. Alternatively, the device 10 may instead be, be integrated into or be configured to be connectable to another device such as a mobile phone, accessory for a phone, tablet etc. The device 10 could be integrated into the housing or cover for a phone or other device, or be a separate entity sized and shaped to be attachable to a phone or other device.

Figure 14:
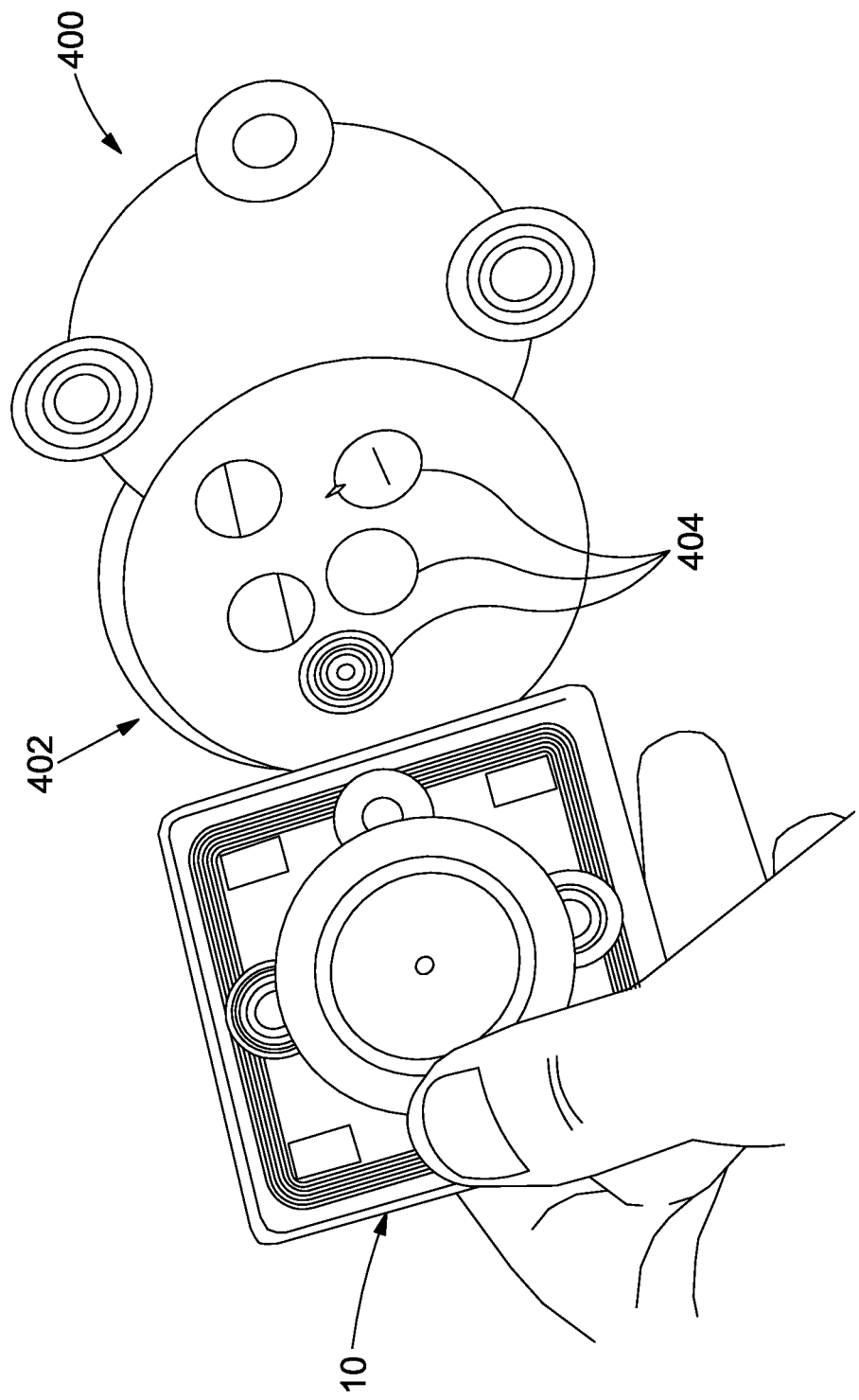

In FIG. 14, a user has selected the icon 28dd. This causes a further visual representation 402 of the data stored in chip 28d to be displayed. Here, a visual representation 404 for each item of data stored on the chip is presented. For example, icons 404 may each represent a bank account, one form of travel authentication data, a store card, building access security authentication etc. The tool 300 enables a user 102 to move data between chips 28 e.g. by dragging and dropping or selecting, clicking etc., to add new data, delete old data. The tool 300 also enables a user to edit the data, e.g. change a PIN or a password, associated with one of the data items 400. The tool 300 also enables the user 102 to control the settings regarding use of the device 10 in general—e.g. to define for which data items an authentication sequence (A) is required and to define that authentication sequence. Thus, some data is stored on the device 10 (e.g. as explained above with reference to FIG. 10), some data is stored on the computing device 40 and/or online and accessed by the computing device 40 (e.g. as discussed in relation to FIG. 11), and other data is held externally by the outlets etc.

Figure 15A:
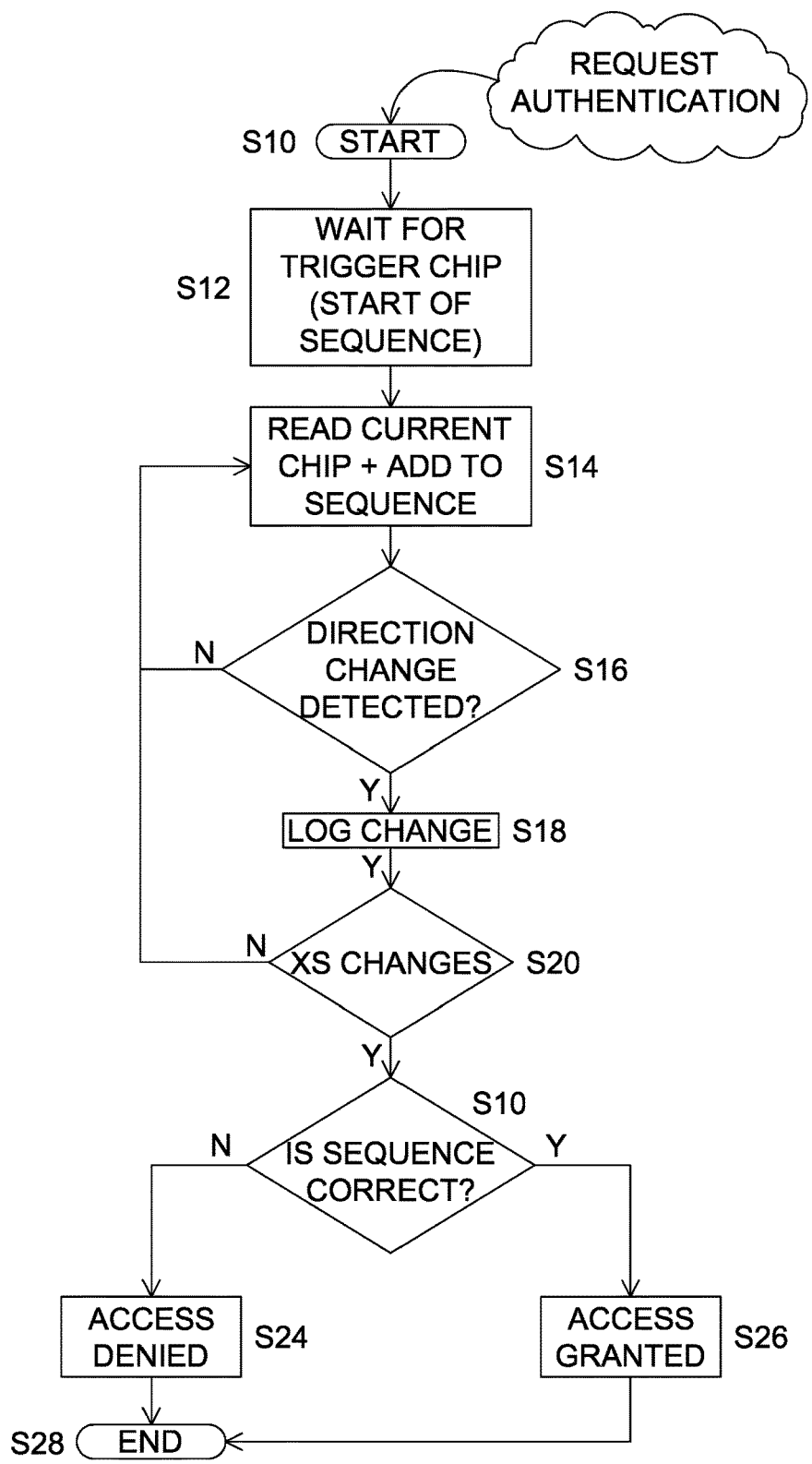
FIG. 15A shows a process for authenticating a device according to embodiments of the invention.

FIG. 15A summarises the steps in the authentication sequence. The sequence starts with a request for authentication S10 when a user presents their device 10 to a NFC reader desiring to make a transaction and authentication is required to permit data to be read via NFC from a chip 28 of the device 10.

At step S12, the NFC reader detects the "trigger chip" 28 to determine the start of the authentication sequence. In an alternative embodiment, the trigger chip may be elsewhere in the authentication sequence, with the step S12 occurring later in the process shown in FIG. 15A as appropriate. At step S14, a current chip 28 connected to circuit 26 is read and recorded. Step S16 determines whether or not there has been a change in direction. If not, the process returns to step S14, otherwise continues to step S18 where the direction change is logged. Once the required number of positions and/or direction changes have been detected, the process continues to step S22. In the embodiment shown, the authentication sequence comprises five positions, but a different number may instead be required as previously discussed. At step S22, if an incorrect or invalid sequence has been read, access to complete the transaction is denied at step S24. Otherwise, if a correct or valid sequence has been detected, at step S26, access to complete the transaction is granted. The process ends at step S28.

Figure 15B:
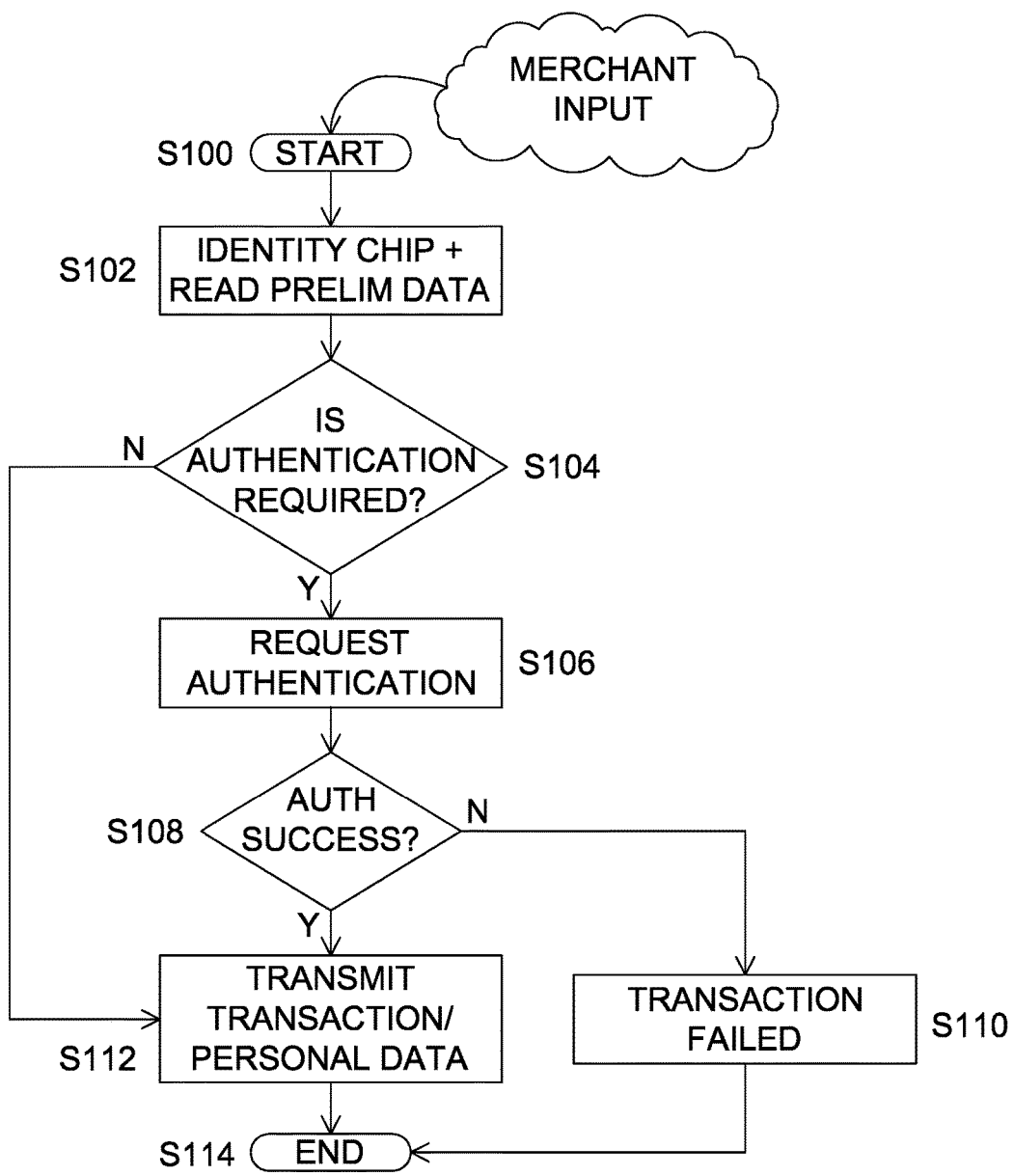
FIG. 15B shows a process for reading information from a device according to embodiments of the invention.

FIG. 15B depicts, in a simplified manner, the information exchange process in a transaction with a merchant or outlet 104. The process starts at step S100, with input from the merchant or outlet 104 (i.e. an NFC reader). At step S102, a chip 28 of the user's device 10 is identified and preliminary data is read therefrom. This data includes an indication of whether an authentication sequence is required, this determination being made at step S104. In the event that an authentication sequence is required, the merchant/outlet 104 requests the authentication from the device 10 at step S106.

Whether the authentication is successful is determined at step S108. In the event of an unsuccessful authentication at step S110, the process ends at step S114. Alternatively, if the authorization is successful, the transaction and/or personal data required to complete the transaction is transmitted from the device 10 to the NFC reader at outlet 104 at step S112. In the event of a transaction not requiring an authentication, the process proceeds straight from step S104 to S112 and then to step S114 enabling the transaction to be completed automatically.

Aspects and embodiments of the invention also lend themselves to sharing information with other users. For example, a user may decide to share some information with another user, which can be achieved through managing the storage of information on the device 10 through the software 300. The data can be shared without the need for a user to physically pass on their device, or their unique authentication sequence. Methods of achieving this include temporary access (software based) for the other user's UID and the other user's unique authentication sequence, to be able to use the first user's information. This could be sharing a credit card, or an airline ticket.

Figure 16A:
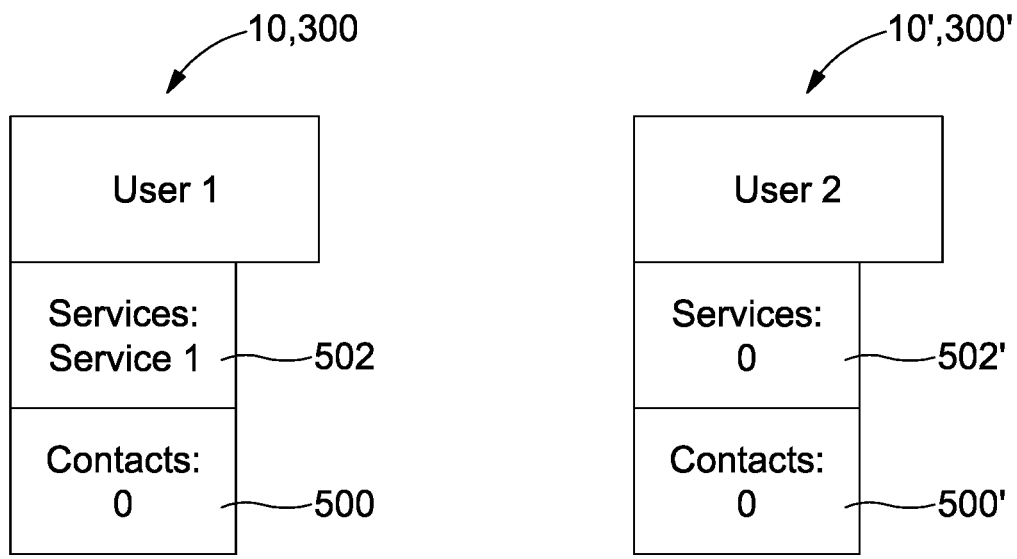
FIGS. 16A to 16D depict the process of information sharing between two user devices according to embodiments of the invention.
Figure 16B:
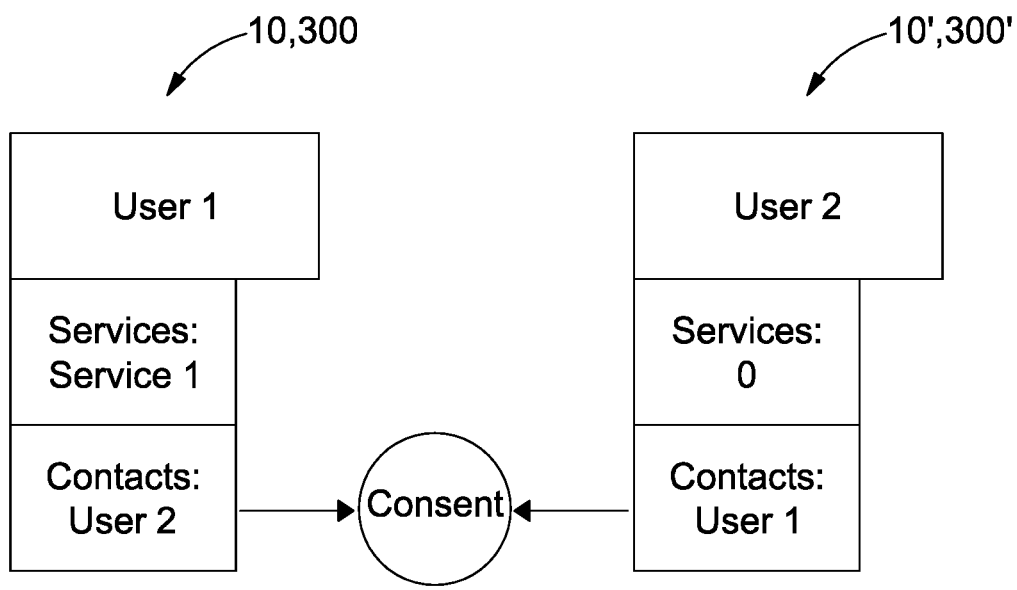
Figure 16C:
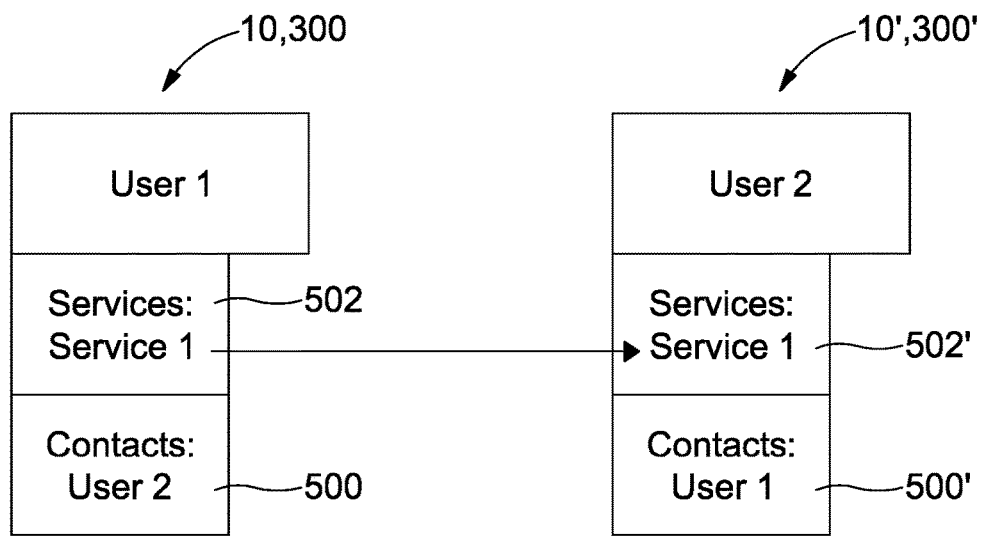
Figure 16D:
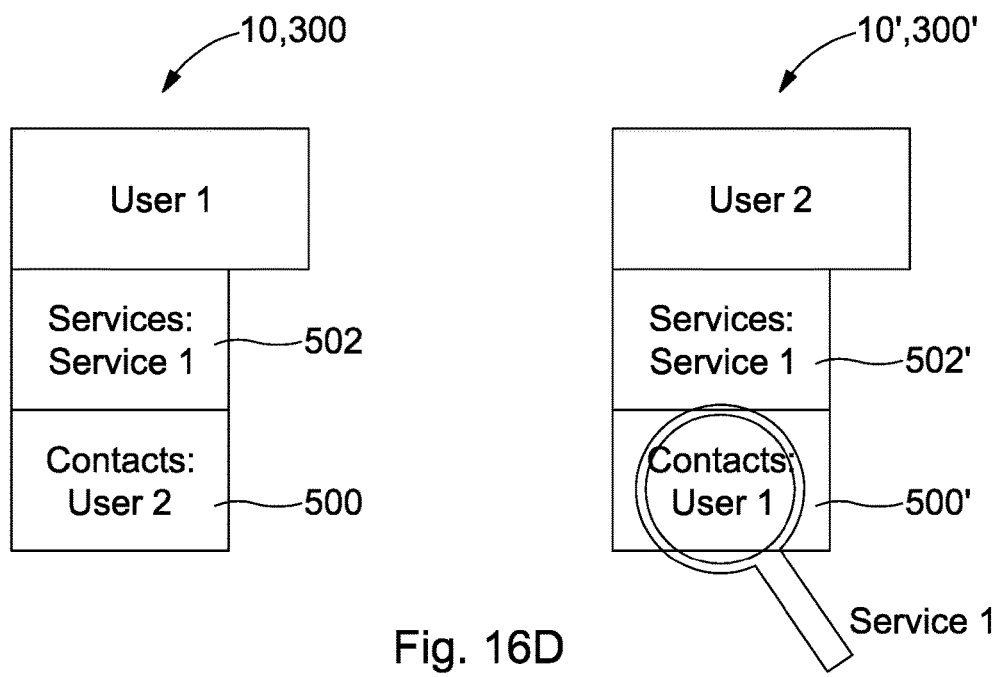

For example, FIG. 16A shows schematically two separate user devices 10, 10' and/or user portals 300, 300'. Their accounts (i.e. the information stored on the devices 10, 10' and/or online 300, 300' may respectively comprise contact information 500, 500' and service information 502, 502'. In FIG. 16B, the two users consent, via their online portals 300, 300', to being contacts to allow future sharing. FIG. 16C shows an example of the user 10 granting user 10' with temporary access to use service 1. The granted access may be made under conditions, such as for a limited period of time, or up to a specified amount of credit/money. The service 502 may authorize the use (502') by user 10' by confirming that user 10' is a contact of user 1 (as shown in FIG. 16D). Additional security/authentication measures, e.g. passwords, PINs etc. may also be used.

The software 300 can also be used to "freeze" the card e.g. in the event they lose the device 10. They can access the software on their own PC/mobile device 40 to lockdown the device 40 to prevent anyone else from using it in the unlikely event that they were able to crack the authentication (if employed). Lockdown may be achieved by alerting an authority (e.g. as is currently done for credit cards). A user may also adopt a similar approach to temporarily halt operability of the device 10 e.g. if they go abroad. Furthermore, if a user purchases a new device, the software 300 quickly and easily enables the user's data to be transferred thereto. I.e. the data stays/moves with the user rather than being confined to a device. Of course, a user may also have multiple devices configured for different uses e.g. one for use in the UK, one for travelling abroad etc.

Additionally, in embodiments of the invention, the security system e.g. with relation to FIGS. 6-10 could be paired with other security protocols (such as biometric authentication, e.g. finger print recognition) for an added authentication level for industries such as security access.

Figure 17A:
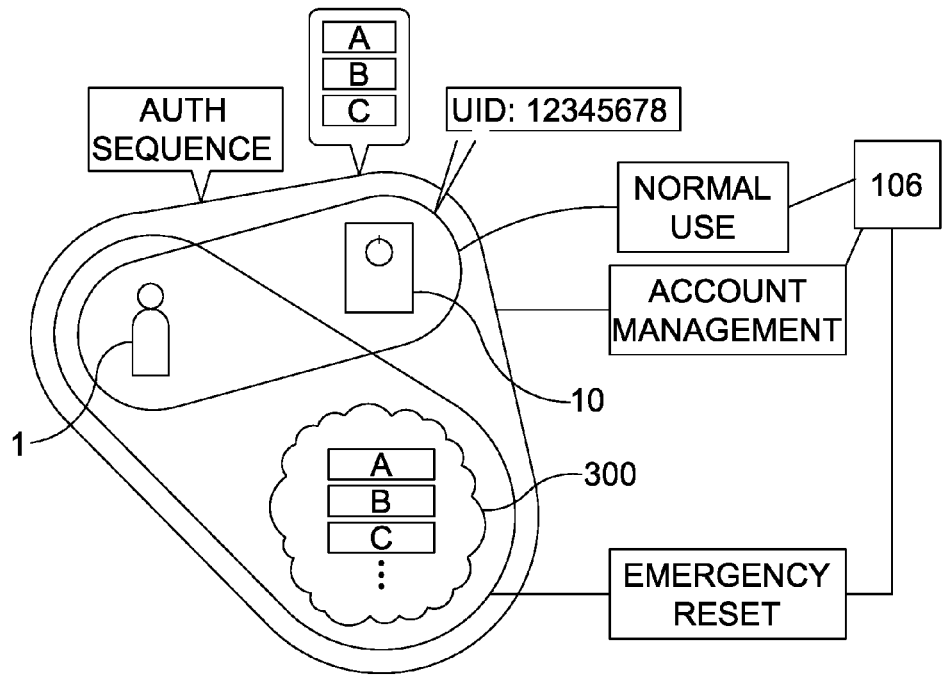
FIG. 17A is a schematic depiction of systems incorporating devices of embodiments of the invention.

FIG. 17A schematically shows a "normal use" interaction between a user 1 and the device 10. The UID of the device is utilised to permit data reading and, optionally, authentication as previously described. When the user 1 wants or needs to undertake "account management" of the data on the device 10, the user 1 uses the device 10 in conjunction with the online management tool 300. The user 1 can manage the storage of data (symbolized by "A", "B", "C" in FIG. 17A, although this is not to be construed as restrictive on the number of data items) through use of the device 10 and portal 300. The user can also set or change the authentication sequence. The user 1 can also access the online management tool 300 without the device 10, e.g. to perform an "emergency reset" or freeze as described above. For each of these three cases, "normal use", "account management" and "emergency reset", there is communication between the device 10 and/or the tool 300 with the access authority to define/permit access as required.

Figure 17B:
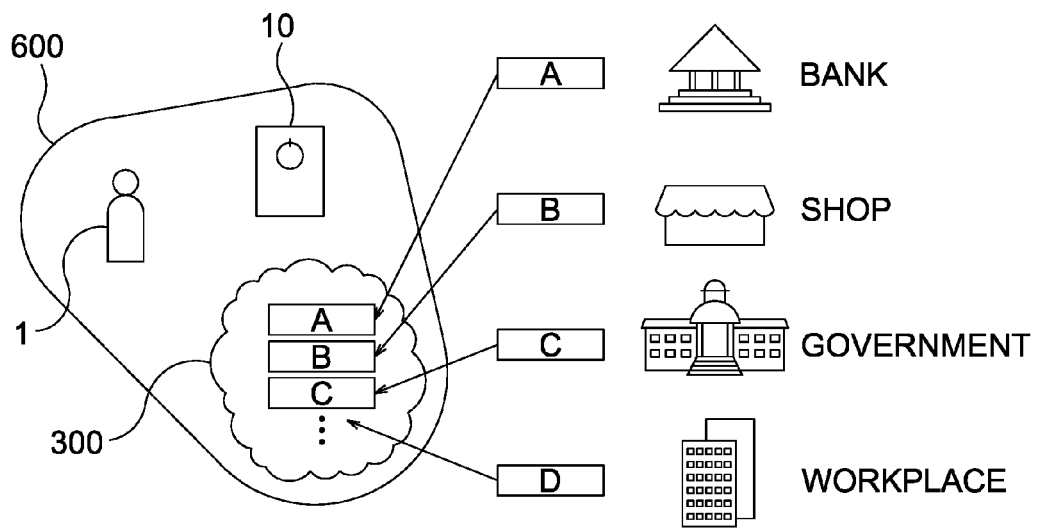
FIG. 17B is a schematic depiction of the communication between a device of embodiments of the invention and external data sources.

FIG. 17B depicts the modular nature of the system. A user 1, a device 10 and a management tool 300 form a system 600. The device 10 and tool 300 store information relevant to different outlets/authorities. In the example shown, a bank provides information in module A, a shop provides information in module B, a government office provides information in module C and a workplace provides information in module D, etc. Corresponding information A, B, C, D . . . is stored by tool 300 and on device 10. The data may be provided/stored as information packets. Each authority can control their own modules, much like creating APIs (application protocol interfaces).

The invention claimed is:

1. A contactless communications device comprising:
one or more near-field communication (NFC) chips each configured to store information and be read by a corresponding NFC reader; and
a selection means, provided on the contactless communications device, for selectively activating one or more of said chips, the selection means being movable relative to the one or more NFC chips to an activation position aligned with a location of one of said NFC chips from which information is desired to be read, and also to one or more other authentication positions to authenticate the device to enable said information to be read when said selection device is placed in said activation position;
wherein, in use, a said NFC reader can read information from one or more of said chips only when selected and activated and when in NFC reading range, and the communications device is configured to permit data to be read from one or more of said chips only when an authentication is performed utilising the selection means in range of a said NFC chip reader, wherein the authentication comprises determining that detecting a position of the selection means has been moved to one or more predefined authentication positions relative to the one or more NFC chips.

2. The communications device according to claim 1, configured to enable information to be read from one or more of said chips only when the selection means is placed in a predefined position relative to one or more of said NFC chips.

3. The communications device according to claim 2, further comprising a first electrically conductive contact, and wherein the selection means comprises a second electrically conductive contact or is otherwise configured to provide an electrical connection to the first electrically conductive contact, to complete an electrical circuit for one or more of said NFC chips when the selection means is placed in a said predefined position.

4. The communications device according to claim 3, wherein the NFC chips are connected in parallel in a circuit with an open electrical contact and, when the selection means is placed in a predetermined position with respect to an open contact of a chip, electrical contact is made to complete the circuit.

5. The communications device according to claim 1, further comprising one or more location markers on the communications device and/or the selection means and, said one or more chips are activated when said one or more location markers are in a predefined position.

6. The communications device of claim 1 wherein the selection means is moveable with respect to and in the plane of said communications device.

7. The communications device of claim 6 wherein the selection means is rotatably or slidably moveable with respect to and within the plane of said communications device.

8. The communications device according to claim 1, wherein said one or more NFC chips are provided and/or embedded on or within a housing or substrate, and said selection means is moveable with respect to said housing.

9. The communications device according claim 1, wherein said selection means is mechanical and/or is configured to be moveable relative to the one or more NFC chips.

10. The communications device according to claim 9, wherein the selection means comprises a dial mounted for rotatable movement, or a slider mounted for linear movement, with respect to and in the plane of said housing.

11. The communications device according to claim 1, wherein the selection means is electronic.

12. The communications device according to claim 11, wherein the selection means is or comprises a touch screen.

13. The communications device according to claim 11, wherein the electronic selection means is configured to respond to a user's digit performing a rotatable movement, or a sliding movement thereon.

14. The communications device according to claim 1, wherein a NFC chip is programmable and reprogrammable, and is configured to store a plurality of data items that can be read when the NFC chip is connected to the circuit and is in range of an NFC reader.

15. The communications device of claim 1, wherein the authentication comprises a sequence of movements of the selection device to activate, in a predefined order, one or more of said NFC chips.

16. The communications device of claim 1, wherein at least one of said NFC chips is configured to permit data to be read therefrom only when an authentication has been performed in range of a NFC chip reader, and wherein at least one other NFC chip is configured to permit data to be read without authentication.

17. The communications device of claim 1, further configured to permit data to be read from one or more of said chips only when a further authentication not utilising the selection means has been performed in range of a said NFC chip reader.

18. The communications device of claim 1, wherein the communications device is a smart card.

19. A contactless communications device comprising:
one or more near-field communication (NFC) chips each configured to store information and be read by a corresponding NFC reader; and
a selection means, provided on the contactless communications device, for selectively activating one or more of said chips, the selection means being movable relative to the one or more NFC chips to an activation position aligned with a location of one of said NFC chips from which information is desired to be read, and also to one or more other authentication positions to authenticate the device to enable said information to be read when said selection device is placed in said activation position;
wherein, the communications device is configured to enable information to be read from one or more of said chips only when the selection means is moved to a predefined position relative to one or more of said NFC chips, and the communications device is configured to permit data to be read from one or more of said chips only when an authentication has been performed utilising the selection means in range of a said NFC chip reader, the authentication comprising a sequence of movements of the selection device to activate, in a predefined order, one or more of said NFC chips by aligning the selection device with said one or more of said NFC chips in said predefined order.

* * * * *